United States Patent [19]
Dufour et al.

[11] Patent Number: 6,049,717
[45] Date of Patent: Apr. 11, 2000

[54] OPERATOR ASSISTED TOOL AND METHOD FOR FREQUENCY PLAN REVISION WITHIN A CELLULAR TELEPHONE SYSTEM

[75] Inventors: Daniel Dufour, Blainville; Sylvain Briere, Laval; Vincent Guimont, Blainville, all of Canada

[73] Assignee: Telefonaktiebolaget L M Ericsson, Stockholm, Sweden

[21] Appl. No.: 09/017,299

[22] Filed: Feb. 2, 1998

[51] Int. Cl.$^7$ .................................................. H04Q 7/00
[52] U.S. Cl. ........................... 455/446; 455/62; 455/452
[58] Field of Search ........................... 455/62, 63, 67.1, 455/446, 447, 448, 449, 450, 451, 452

[56] References Cited

U.S. PATENT DOCUMENTS

| | | | |
|---|---|---|---|
| 5,179,722 | 1/1993 | Gunmar et al. | 455/446 |
| 5,293,640 | 3/1994 | Gunmar et al. | 455/446 |
| 5,375,123 | 12/1994 | Andersson et al. | 455/452 |
| 5,442,804 | 8/1995 | Gunmar et al. | 455/446 |
| 5,490,137 | 2/1996 | Hulsebosch et al. | |
| 5,507,007 | 4/1996 | Gunmar et al. | 455/446 |
| 5,722,043 | 2/1998 | Rappaport et al. | 455/447 |
| 5,752,192 | 5/1998 | Hamabe | 455/452 |

OTHER PUBLICATIONS

PCt International Search Report, Jun. 22, 1999, PCT/SE 99/00065.

*Primary Examiner*—Edward F. Urban
*Assistant Examiner*—Senai Kibreab
*Attorney, Agent, or Firm*—Jenkens & Gilchrist PC

[57] ABSTRACT

Utilizing a three pass processing procedure, a frequency plan revision proposal is defined, verified, implemented and confirmed by a network operator. In a first pass (evaluation), interference and bit error rate measurements are evaluated and used to create one or more proposals. These proposals are evaluated to confirm compatibility with the current cell configuration, coordination with previous proposals, and assignment of frequencies. In a second pass (pre-update verification), more measurements are evaluated to confirm the first pass proposals. A single proposal for each selected cell is then chosen for implementation in a network update. In a third pass (post-update verification), the measurements are again evaluated to verify, following the update, that the implementation of the proposal had a positive effect on the network.

58 Claims, 7 Drawing Sheets

OPERATOR ASSISTED TOOL AND METHOD FOR FREQUENCY PLAN REVISION WITHIN A CELLULAR TELEPHONE SYSTEM

CROSS-REFERENCE TO RELATED APPLICATION

The present application is related to and incorporates by reference previously filed, commonly assigned, co-pending application for patent "METHOD FOR FREQUENCY MODE VALIDATION FOR, FREQUENCY ASSIGNMENT FOR, AND EVALUATING THE NETWORK EFFECT OF A FREQUENCY PLAN REVISION WITHIN A DUAL MODE CELLULAR TELEPHONE SYSTEM", Ser. No. 08/852,879, filed May 8, 1997, by Vincent Guimont, et al.

BACKGROUND OF THE INVENTION

1. Technical Field of the Invention

The present invention relates to cellular telephone systems and, in particular, to an operator assisted tool and method for assigning frequencies to transceivers in cells of a cellular telephone system supporting analog and/or digital communications channels.

2. Description of Related Art

Cellular telephone systems divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via data links and voice trunks with a central control station, commonly referred to as a mobile switching center, which functions to selectively connect telephone calls to the mobile stations through the base stations and, in general, control operation of the system.

Each cell is assigned use of a predetermined set of frequencies from the cellular frequency band for use in providing its control and voice/data (traffic) channels. The assignment is typically made in accordance with a certain frequency plan. The frequencies used for the control and traffic channels assigned to a given cell are preferably spaced apart from each other across the frequency spectrum of the cellular frequency band. This serves to minimize the instances and adverse affects of co-channel and adjacent channel interference.

Because only a limited number of frequencies are available in the cellular frequency band, the same frequencies that are assigned to one cell are also assigned to (i.e., reused by) other cells in distant parts of the service area. Typically, adjacent cells are not assigned to use the same frequency by the frequency plan. Furthermore, the power levels of the signal transmissions on any given frequency are limited in strength so as to limit propagation beyond the cell area. The foregoing precautions serve to reduce instances of co-channel interference caused by reuse of that same frequency in a distant cell. It is further noted that careful power level and distance assignment also assists in reducing instances of adjacent channel interference.

In spite of the precautions taken by service providers in the frequency plan assignment for a frequency reuse cellular telephone system and in the regulation of system operation, it is known that instances of co-channel interference do occur. This interference may be affected by a number of factors including: terrain irregularities; radio propagation changes; fading; multipath propagation; reflection; existence of human and natural obstructions; the number of available transceivers per cell; and variations in traffic demand. This interference often adversely affects system operation by, for example, degrading voice quality on the traffic channels or interfering with the transmission and reception of control signals on the control channels. Service providers accordingly monitor on a cell by cell basis for instances of adjacent channel and co-channel interference on the assigned frequencies, as well as for instances of relatively low interference on other frequencies, and in response thereto make requests for a revision in the frequency plan assignment of frequencies for that cell. Such a revision is often referred to in the art as a "proposal" for change.

Now that both digital, analog and dual mode systems are being implemented, and also because of the increased use of layer cell architectures, the process for making and implementing a request for a revision in the frequency plan assignment is becoming more complicated. The primary reason for the added complication relates to the fact that certain frequencies in the cellular frequency band may be specified solely for use with analog control or traffic channels, while other frequencies are specified solely for use wish digital control or traffic channels. Still other frequencies in the cellular frequency band may be specified for dual mode use. At the same time, the transceivers comprising the cell configuration of a cell may be assigned for either analog or digital control/traffic channel use. The heart of the problem resides in the fact that mode authorizations for the frequencies included in the proposal may not necessarily coincide with the mode capabilities of the transceivers. Accordingly, it is imperative that any revision in the frequency plan assignment take into account the specified modes of the frequencies within the proposal in the context of the specified operating modes of the transceivers for the cell configuration. Another problem lies in the fact that each cell evaluates interference, and makes requests for frequency plan assignment revisions by considering only its own needs, and fails to consider either the effect of such assignment revisions on other cells within the network or the other proposals being made for frequency reassignment.

What is needed then is a method that validates from a frequency group mode perspective the frequencies of a given proposal in view of the transceiver mode requirements of a given cell, and further coordinates the cell based requests for revision to the frequency plan assignment to the benefit of each of the cells of the network rather than the benefit of just an individual cell. Preferably, this method should be implemented with the assistance of the cellular service operator in an interactive manner through the use of visual planning aids.

SUMMARY OF THE INVENTION

To address the foregoing and other concerns, the present invention comprises an operator assisted tool and method for assigning frequencies to transceivers in cells of a cellular telephone system supporting analog and/or digital communications channels. The method implements a three pass processing procedure. In a first pass, referred to as evaluation, radio environment statistics measurements reporting uplink interference measurements and uplink/downlink bit error rate measurements are evaluated and used to create one or more frequency reallocation proposals for one or more cells. In a second pass, referred to as pre-update verification, downlink interference measurements are evaluated, in addition to the uplink interference measurement and uplink/downlink bit error rate measurements, to confirm the one or more proposals for the one or more cells determined. A single proposal for each selected cell is then chosen for implementation in a retune. In a third pass, referred to as post-update verification, the uplink and downlink interference and bit error rate information is again evaluated to verify, following network update, that the implementation of the proposal had a positive effect on the network with respect to each cell the was retuned as well as with respect to their co-channel cells.

The evaluation performed during the first pass evaluates each proposal for a revision in the frequency plan assignment to determine whether it is compatible with the current cell configuration of the selected cell. In this regard, the frequencies of the proposal are evaluated to insure that sufficient frequencies having appropriate operating modes (analog, digital, and the like) are available to meet the traffic channel requirements of the included cell transceivers. The frequencies of the proposal are further evaluated to insure that they can support the control channel (analog and/or digital) requirements of the cell.

The evaluation performed during the first pass further assigns frequencies from the proposal to the included cell transceivers for the current cell configuration. In a first step, the frequencies for the control channels (analog and/or digital) are assigned to the control channel transceivers. In a second step, the remaining frequencies are assigned to the traffic channel transceivers. For the second step, the assignment is made in accordance with either: the top to bottom ordering of the frequencies; the bottom to top ordering of the frequencies; or, the least to most interfered frequencies.

The evaluation performed during the first pass still further evaluates for network effect the individual cell proposals to revise the frequency plan assignment. Such revisions typically comprise the dropping one or more frequencies of a sub-frequency group in favor of the addition of one or more other frequencies of another sub-frequency group. A record is kept of previously approved revisions to the frequency plan assignment. A determination is then made as to whether a current proposal for a frequency plan revision conflicts with any of the previously approved proposals maintained by the record. A conflict is found when: the sub-frequency group dropped and/or added by the current proposal at issue matches or is adjacent to a sub-frequency group dropped and/or added in the record of the previously approved proposals; and a distance between the cell of the current proposal at issue and the cell of the previously approved proposal in the record is less than a certain threshold distance. Alternatively, a conflict is found if a frequency dropped and/or added by the current proposal at issue matches or is adjacent to a frequency dropped and/or added in the record of the previously approved proposals; and a distance between the cell of the current proposal at issue and the cell of the previously approved proposal in the record is less than a certain threshold distance.

The frequency planning tool of the present invention supports interactive operator participation in the three pass process. Through a graphical user interface, the operator is presented with information concerning the radio environment statistics measurements, and is allowed based on the information to interactively develop each proposal. A selection of a single proposal per cell may also be made to initiate the retune. Furthermore, the operator is presented with pre-update verification results, and is allowed based on the results to interactively select one proposal per cell for implementation and retune. Additionally, following retune, the operator is presented with post-update verification results, and is allowed to consider based on the results the effects of network update, determine efficacy, and then either confirm the update or institute a roll-back. In each case, the tool provides special aids for operator use in constructing and evaluating proposals. These aids include features for cell sorting by uplink interference, restricted viewing of candidates to a given mode, of a given orientation or containing a certain number of frequencies.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

There are a plurality of radio frequencies in the cellular frequency band available to cellular telephone system providers for use in communicating with mobile stations. In an analog cellular telephone system, like the known advanced mobile phone service (AMPS) communications system, there is one frequency division multiple access (FDMA) analog communications (either control or traffic) channel per frequency. In a digital cellular telephone system, like the known D-AMPS or Global System for Mobile (GSM) communications systems, however, there are a plurality of time division multiple access (TDMA) digital communications channels (time slots) per frequency.

A cellular service area can cover a large geographic region, and in many instances there will be a need for a large number of cells. Often times, the number of cells needed exceeds the number of cells provided by dividing the available frequencies amongst the cells in such a manner as to handle expected subscriber usage per cell. In such a case there are simply not enough frequencies in the cellular frequency band for unique assignment to the included cells. In order then to provide sufficient call handling capacity throughout the service area, the cells are grouped into clusters of cells and the frequencies in the cellular frequency band are divided amongst and reused in each of the clusters in accordance with a certain frequency assignment plan.

Figure 1:
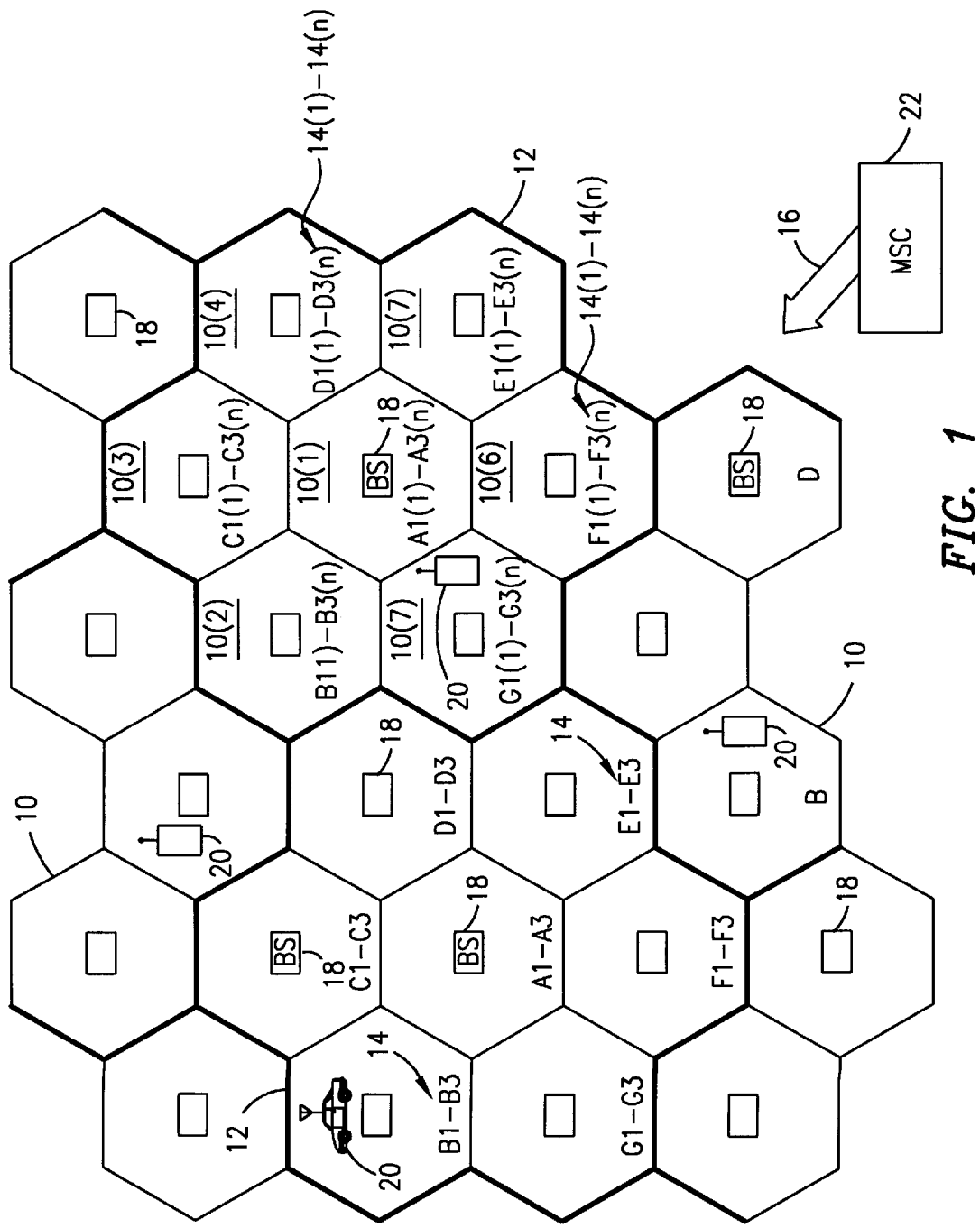
FIG. 1 is a cell diagram schematically illustrating an exemplary frequency plan assignment within a frequency reuse cellular telephone system.

Reference is now made to FIG. 1 wherein there is illustrated an exemplary cell structure and frequency plan assignment for use in a radio frequency reuse cellular telephone system. An arbitrary geographic region (hereinafter "the service area") is divided into a plurality of contiguous cells 10 schematically represented by hexagons. Although not specifically illustrated, each of the cells is sectorized to include three sub-cells. The cells 10 are then grouped into clusters 12 (outlined in bold to ease recognition). For example, in the frequency plan of FIG. 1, each cluster 12 includes seven cells 10(1)–10(7). It will, of course, be understood that each cluster 12 may have more or less cells 10 as required by the selected frequency plan.

The available frequencies in the cellular frequency band are divided in accordance with the frequency plan into frequency groups 14, with the frequency groups assigned amongst the cells 10 (including their sectors) of each cluster 12 such that the radio frequencies of the cellular band are reused in each cluster. For example, in a cell structure having seven cells 10 (with three sectors each) per cluster 12 like that shown in FIG. 1, there are seven frequency groups 14 identified and differentiated from each other by the alphabetic labels "A" through "G" corresponding to the cells 10(1)–10 (7), respectively. Thus, each cell 10(1) in the service area is assigned use of radio frequencies of the cellular band in frequency group A1–A3, each cell 10 (2) is assigned use of radio frequencies of the cellular band in frequency group B1–B3, and so on up to each cell 10(7) being assigned use of radio frequencies of the cellular band in frequency group G1–G3. Furthermore, each frequency group 14 is divided into a plurality (n) of sub-frequency groups 14(1)–14(n). Thus, frequency group A1 includes sub-frequency groups A1(1) through A1 (n), frequency group B2 includes sub-frequency groups B2(1) through B2 (n), and so on up through the sub-frequency groups G3(1) through G3(n) of frequency group G3.

It will be noted that in such a frequency plan, adjacent cells are typically not assigned use of the same frequency. Reuse of an identical frequency in the service area is preferably made with a separation of at least more than one cell 10 along with a regulation of broadcast power from each cell to constrain radio propagation substantially within the cell area. Furthermore, it will be noted that typically no one cell 10 utilizes adjacent frequencies in the cellular band. Adjacent frequencies are preferably assigned no closer than one cell 10 away from each other. By arranging the cells 10 in clusters 12 as shown in FIG. 1, regulating broadcast power of communications within the cell as mentioned above, and further by assigning frequencies in the fashion mentioned above, the likelihood of interference is reduced while simultaneously providing effective cellular communications services across a very large service area.

Each of the cells 10 in a cellular telephone system such as that illustrated in FIG. 1 includes at least one base station (BS) 18 configured to facilitate radio frequency communications with mobile stations 20 moving throughout the service area. The base stations 18 are illustrated as being positionally located at or near the center of each of the cells 10. However, depending on geography and other known factors, the base stations 18 may instead be located at or near the periphery of, or otherwise away from the centers of, each of the cells 10. In such instances, the base stations 18 may broadcast and communicate with mobile stations 20 located within the cells 10 using directional rather than omni-directional antennas. The base stations 18 are connected by communications links (generally shown by arrow 16) to at least one mobile switching center (MSC) 22 operating to control the operation of the system for providing cellular communications with the mobile stations 20. Each base station 18 includes a plurality of transceivers (not shown) capable of operating independently on different radio frequencies assigned to the cell. Operation of the mobile switching center 22 and base station 18 to provide cellular telephone service is well known to those skilled in the art, and will not be described.

In spite of the precautions taken to avoid interference, it is known that interference does occur in cellular systems like that previously described. One aspect of this interference originates from adjacent frequency communications occurring simultaneously in cells 10 of the same or other clusters 12 (i.e., adjacent channel interference). Another aspect of this interference originates from same frequency communications occurring simultaneously in the cells 10 of other clusters 12 (i.e., co-channel interference). To combat this interference, the cellular service provider often engages in occasional revisions of the frequency plan wherein one or more frequencies (comprising sub-frequency groups 14(n) or frequency groups 14) assigned to a cell 10 are dropped in favor of the addition of one or more other frequencies (comprising sub-frequency groups or frequency groups) contained within the cellular band. In this regard, the frequencies (in a sub-frequency group 14(n) or frequency group 14) assigned by a current version of the frequency plan to a given cell comprise "selected" frequencies with respect to that given cell, and all other frequencies in the cellular band, which are normally selected frequencies for other cells, comprise "candidate" frequencies that could possibly be assigned to that given cell as a result of the revision in the frequency plan. The point of the revision then is to delete one or more of the selected frequencies (comprising sub-frequency groups 14(n) or frequency groups 14) for a cell which are interfered, and assign in place thereof a corresponding one or more un-interfered or less-interfered candidate frequencies (from other sub-frequency groups or frequency groups). In many cases, however, such a revision in the frequency plan with respect to a given cell 10 fails to take into consideration the effect the revision may have on other cells of the cellular telephone system.

Open Loop Processing

Figure 2:
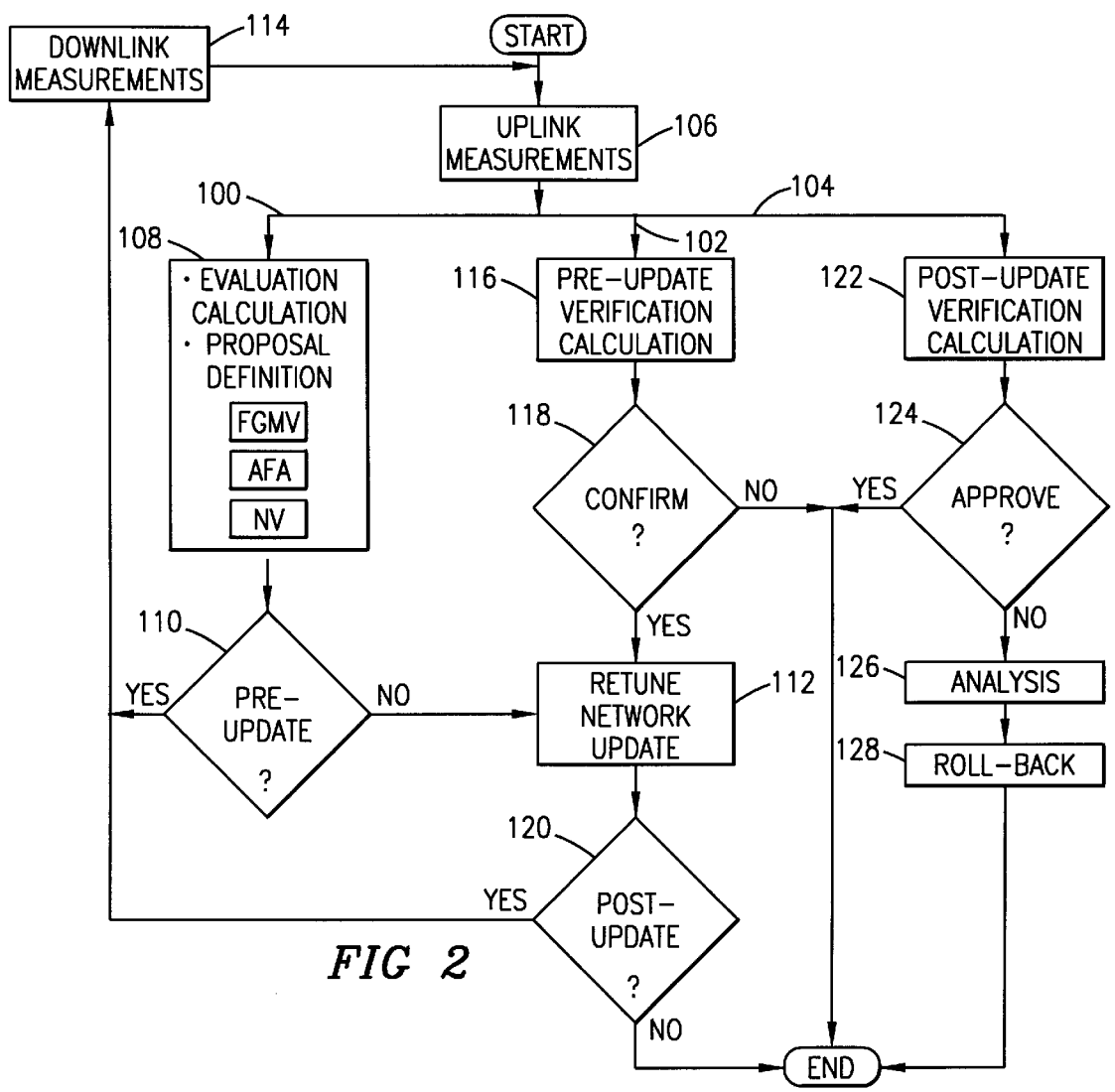
FIG. 2 is a flow diagram for an "open loop" procedure of the present invention for effectuating a revision in a frequency plan for a cellular telephone system.

Reference is now made to FIG. 2 wherein there is shown a flow diagram for an "open loop" procedure of the present invention to effectuate a revision in a frequency plan for a cellular telephone system. By "open loop" it is meant that the procedure operates in an interactive manner with the participation and supervision of a network service operator or service provider (i.e., in a non-autonomous manner). The open loop procedure, in general, comprises a three-pass operation. A first pass, identified generally by arrow 100, is referred to as evaluation. The evaluation pass 100 is always performed, and involves the creation of one or more proposals by the operator for one or more cells in response to the consideration of radio environment statistics measurements which report uplink interference measurements and uplink/downlink bit error rate measurements. These created proposals are designed to effectuate a revision in the frequency plan by deleting one or more of the selected frequencies (comprising sub-frequency groups 14(n) or frequency groups 14) for a cell which are interfered, and assigning in place thereof a corresponding one or more un-interfered or less-interfered candidate frequencies (from other sub-frequency groups or frequency groups). A second pass, identified generally by arrow 102, is referred to as pre-update verification. The pre-update verification pass 102 is performed at the option of the operator, and involves the confirmation of no more than one proposals for each of the one or more cells determined in the evaluation pass 100 in response to the consideration of downlink interference measurements in addition to the re-consideration of uplink interference measurements and uplink/downlink bit error rate measurements. A third pass, identified generally by arrow 104, is referred to as post-update verification. The post-update verification pass 104 is performed at the option of the operator, and involves the verification, following network update in accordance with one of the proposals, that interference levels following network update are satisfactory.

A typical execution of the open loop procedure may be described as follows. First, uplink interference measurements and uplink/downlink bit error rate measurements are taken in step 106. These measurements are taken using a conventional radio environment statistics recording function supported by the network. The radio environment statistics data is then parsed and stored in a relational database. The data is also validated to confirm its consistency with respect to the number of samples used. The open loop procedure then enters the evaluation pass 100 where evaluation calculations based on the measurements are made in order to rank candidate and selected sub-frequency groups. The operator may then interactively participate in the process by selecting, from amongst all of the ranked candidate sub-frequency groups, those particular candidate sub-frequency groups for potential assignment to a given cell, and also for de-selecting, from amongst all of the ranked selected sub-frequency groups, those particular selected sub-frequency groups for potential removal from that given cell (action 108). Certain special construction aids (to be described) are utilized by the operator at this point to assist in the selection process. This selection activity by the operator comprises the generation of a proposal. More than one proposal per cell, and more than one cell per evaluation pass 100, may be placed under consideration by the operator. At this point, the proposal is validated against certain validation rules (e.g., mobile network configuration check rules concerning channel allocation —such as channel separation and potential intermodulation products—and data required for hand-off). The operator then has the option (step 110) to request pre-update verification (through pass 102) for each of the created proposals. The pre-update verification pass 102 assists the operator in identifying unacceptable proposal, and narrowing proposal options such that there is only one (best or preferred) proposal per cell prior to update. Because current analog mobile station technology does not support the making and reporting of downlink interference measurements, pre-update verification is only authorized for networks that are either digital or dual mode in nature. If pre-update verification is not selected, the procedure implements the network update in accordance with the created proposals (step 112), provided no more than one proposal per cell exists. If, on the other hand, the operator selects pre-update verification, downlink interference measurements are made in step 114. Furthermore, the procedure loops back around and additional uplink interference measurements and uplink/downlink bit error rate measurements are made (step 106). Pre-update verification calculations based on the uplink and downlink measurements are then made in step 116 to allow the user to confirm the viability of the considered proposals, and then cancel or confirm the proposals in accordance with their determined viability. A determination is then made in step 118 as to whether the proposal was confirmed in pre-update verification. If yes, the procedure implements the network update in accordance with the accepted proposal (step 112). It is noted here that the network update may either be handled autonomously by the network in accordance with known techniques, or may be manually implemented, as desired. If, on the other hand, the proposal was not accepted, the procedure ends. Following implementation of the network update through a retune in step 112, the operator then has the option (step 120) to request post-update verification (through pass 104) for each of the accepted and implemented proposals. The post-update verification pass 104 assists the operator in identifying implemented (i.e., deployed) proposals that do not satisfactorily reduce interference and improve network operation. If post-update verification is not selected, the procedure ends. If, on the other hand, the operator selects post-update verification, the procedure loops back around to make additional downlink interference measurements (step 114) and additional uplink interference measurements and uplink/downlink bit error rate measurements (step 106). Post-update verification calculations based on the uplink and downlink measurements are then made in step 122 to confirm the acceptability of the deployed proposals (i.e., did the changes in the network produce the expected results concerning uplink interference with respect to the cell itself and its co-channel cells) The operator is then given the option (step 124) to confirm the deployed proposal. If confirmed, the procedure ends. If not confirmed, perhaps because the expected results were not obtained, an analysis is made by the operator in step 126 concerning which of the deployed proposals should be abandoned. Once these one or more proposals are identified, the network implements a roll-back in step 128 to return each cell affected by an unacceptable deployed proposal back to its original configuration state prior to the step 112 network update. It is noted here that prior to roll-back, the operator may perform a network effect and mobile network configuration check.

Figure 3:
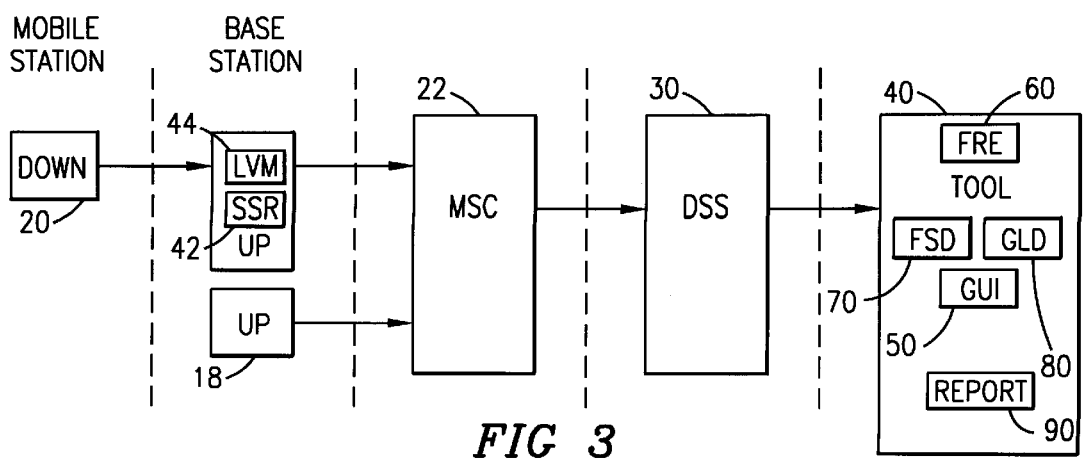
FIG. 3 is a block diagram of a portion of the cellular network of FIG. 1.

Reference is now made to FIG. 3 wherein there is shown a block diagram of a portion of the cellular network of FIG. 1. The network includes a base station 18 for each cell in communication with mobile stations 20. The base stations 18 are each connected to a single mobile switching center 22. The mobile switching centers 22 are connected to an operation support system (OSS) 30. Finally, in accordance with the present invention, the operation support system 30 is connected to (or is incorporated in) an interactive frequency planning tool 40. Using this interactive frequency planning tool, and implementing the procedure set forth in FIG. 2 and described above, an operator may evaluate network performance, select proposals for retune, and control frequency planning.

Each base station includes a signal strength receiver (SSR) 42 and a location verification module (LVM) 44. Using the signal strength receiver 42 and/or a location verification module 44, the network collects uplink interference measurements on candidate frequencies (see, step 106, FIG. 2). Filtering of these measurements is performed in the base station 18 itself before being reported back to the mobile switching center 22 and passed on to the frequency planning tool 40 through the operating support system 30. Utilizing the mobile assisted hand-off (MAHO) measurement functionality of the mobile stations 20, downlink interference measurements are made on the candidate frequencies (see, step 114, FIG. 2). Filtering of these measurements is performed in the mobile switching center 22 before being reported back to the frequency planning tool 40 through the operating support system 30. The uplink bit error rate measurements on selected frequencies are made by the base stations 18 on the digital voice channels (see, step 106, FIG. 2) and are reported to the operating support system 30 through the mobile switching center 22. The downlink bit error rate measurements on selected frequencies are made by the mobile stations 20 on the digital voice channels (see, step 106, FIG. 2) and are reported to the operating support system 30 through the base station 18 and the mobile switching center 22. Filtering of these bit error rate measurements is performed in the operating support system 30, with the filtered information reported to the frequency planning tool 40. The uplink analog interference measurements on selected frequencies are made by the base stations 18 on the analog voice channels (see, step 106, FIG. 2) and are reported to the operating support system 30 through the mobile switching center 22. Filtering of these uplink interference measurements is performed in the operating support system 30, with the filtered information reported to the frequency planning tool 40. Finally, the uplink digital interference measurements on selected frequencies are made by the base stations 18 on the digital voice channels (see, step 106, FIG. 2). Filtering of these measurements is performed in the base station 18 itself before being reported back to the mobile switching center 22 and passed on to the frequency planning tool 40 through the operating support system 30.

Reference is now once again made to FIG. 2 for a more detailed explanation of the open loop procedure. Attention is first directed to the process implemented in connection with the making of uplink interference measurements and uplink and downlink bit error rate measurements in step 106. A number of measurement periods (e.g., up to four per day) are defined by the system operator. It is within each of these defined measurement periods that the radio environment statistics measurements and mobile assisted hand-off measurements are made for purposes of frequency planning. For each of the calculations performed by the procedure (see, steps 108, 116 and 122), the operator may select not only which one or ones of the measurement periods should be used, but also the total number of measurement periods that must be completed before the calculation is executed. Furthermore, the operator may selectively use more than one measurement period, if desired, in order to gain more confidence in the measurements. The operator may further specify that the step 106 measurements are to be performed with respect to the cells associated with only certain ones of the mobile switching centers in the network. Furthermore, in connection with network that supports multiple operation types (e.g., AMPS, D-AMPS 800 MHz, D-AMPS 1900 MHz, or Down Banded Cellular (DBC)), the operator may select which one or ones of the network types should have measurements performed. The action of step 106 further determines which radio characteristic(s) should be used in making the radio environment statistics measurements based upon frequency ranges (i.e., hyperband) and the network type (AMPS, D-AMPS, DBC).

Attention is next directed to the process for making the evaluation calculation of step 108. Depending on the mode of the sub-frequency group involved, the following is calculated. For selected sub-frequency groups containing only analog voice channels, calculate:

(a) $I_{up\_sel\_freq\_eval}$: the uplink interference value for a frequency assigned to an analog voice channel using data obtained from an appropriately selected radio characteristic plus P2 plus P3. wherein:
   P2 is a systematic difference parameter defining an analog margin to be added to the measurements as well as a compensation factor to account for dual mode sub-frequency groups; and
   P3 is a systematic difference parameter defining a margin between analog and digital measurements; and (b) $I_{up\_sel\_eval}$: the average uplink interference value for the sub-frequency group comprising the straight average of the values for $I_{up\_sel\_freq\_eval}$ values for each voice channel in the sub-frequency group.

For selected sub-frequency groups containing only digital voice channels, calculate:

(c) $I_{up\_sel\_freq\_eval}$: the uplink interference value for a frequency assigned to a digital piece of channel equipment comprising the average of the filtered value for each digital voice channel connected to that piece of channel equipment using data obtained from an appropriately selected radio characteristic plus P1, wherein:
   P1 is a systematic difference parameter defining a digital margin to be added to the measurements taking into consideration the hyperband being used by the sub-frequency group;

(d) $I_{up\_sel\_eval}$: the average uplink interference value for the sub-frequency group comprising the straight average of the $I_{up\_sel\_freq\_eval}$ values for each digital piece of channel equipment in the sub-frequency group;

(e) $BER_{up\_freq\_eval}$: the uplink bit error rate for a frequency assigned to a digital piece of channel equipment comprising the average of the filtered value for each digital voice channel connected to that piece of channel equipment using data obtained from an appropriately selected radio characteristic;

(f) $BER_{up\_eval}$: the average uplink bit error rate value for the sub-frequency group comprising the straight average of the $BER_{up\_freq\_eval}$ values for each digital piece of channel equipment in the sub-frequency group;

(g) $BER_{dn\_freq\_eval}$: the downlink bit error rate for a frequency assigned to a digital piece of channel equipment comprising the average of the filtered value for each digital voice channel connected to that piece of channel equipment using data obtained from an appropriately selected radio characteristic; and (h) $BER_{dn\_eval}$: the average downlink bit error rate value for the sub-frequency group comprising the straight average of the $BER_{dn\_freq\_eval}$ values for each digital piece of channel equipment in the sub-frequency group.

For selected sub-frequency groups containing both analog and digital voice channels, calculate:

(i) $I_{up\_sel\_eval}$: the average uplink interference value, comprising:

$$I_{up\_sel\_eval} = (SUM(I_{up\_freq\_eval(digital)} + P1) + SUM(I_{up\_sel\_freq\_eval(analog)} + P2 + P3))/(m+n)$$

wherein:

$I_{up\_sel\_freq\_eval(digital)}$ is the average of the values reported by the digital voice channels using a frequency of that sub-frequency group;

$I_{up\_sel\_freq\_eval(analog)}$ is the average of the values reported by the analog voice channels using a frequency of that sub-frequency group;

n is the number of analog frequencies in the sub-frequency group;

m is the number of digital frequencies in the sub-frequency group;

P1, P2 and P3 are as defined above;

(j) $BER_{up\_eval}$ (see, item (f) above); and (k) $BER_{dn\_eval}$ (see, item (h) above).

Furthermore, $I_{up\_sel\_w\_eval}$, $BER_{up\_w\_eval}$ and $BER_{dn\_w\_eval}$ shall be calculated on a cell level using the selected sub-frequency groups with the average weighted by the number of frequencies in each sub-frequency group.

For the candidate sub-frequency groups, calculate:

(l) $I_{up\_cand\_freq\_eval}$: the uplink interference value for a frequency (corrected, if necessary, using P3); and (m) $I_{up\_cand\_eval}$: the average uplink interference value for the sub-frequency group comprising the straight average of the $I_{up\_cand\_freq\_eval}$ values for each frequency in the sub-frequency group.

Reference is once again made to FIG. 3. Utilizing a graphical user interface 50 of the frequency planning tool 40, an operator may view the (a)–(m) results of the FIG. 2, step 108 evaluation process. Standard graphical user interface controls are supported for controlling the viewing options and changing the information to be viewed. Furthermore, support is provided, although not shown, for having centralized processing of information by the tool 40, with distributed multi-terminal graphical user interfaces 50 for operator manipulation.

Concerning an operator selected mobile switching center, a list of all the cells associated with that mobile switching center is presented through the interface 50. This list is sorted for display in decreasing order of $I_{up\_sel\_w\_eval}$ (but may alternatively be sorted in decreasing order of worst $I_{up\_sel\_eval}$) On a cell level, information may be obtained through user interface 50 interaction concerning, for example, cell name, $I_{up\_sel\_w\_eval}$, $BER_{up\_w\_eval}$ and $BER_{dn\_w\_eval}$. Upon selection of particular cell from the list, sub-frequency group information may be obtained through user interface 50 interaction concerning, for example, sub-frequency group name, mode, number of assigned/available frequencies, $I_{up\_sel\_eval}$, $BER_{up\_eval}$ and $BER_{dn\_eval}$. Still further, upon selection of particular sub-frequency group from the list, channel information may be obtained through user interface 50 interaction concerning, for example, channel number, channel equipment assignment, $I_{up\_sel\_freq\_eval}$, $BER_{up\_freq\_eval}$ and $BER_{dn\_freq\_eval}$. The graphical user interface 50 further supports the highlighting of certain data in the cell list comprising:

cells having an $I_{up\_sel\_w\_eval}$ within a certain operator selected range;

cells having its worst $I_{up\_sel\_eval}$ within a certain operator selected range;

cells having a $BER_{up\_w\_eval}$ within a certain operator selected range;

cells having a $BER_{dn\_w\_eval}$ within a certain operator selected range; and cells having a BER difference ($BER_{up\_w\_eval}$–$BER_{dn\_w\_eval}$) within a certain operator selected range.

Furthermore, concerning a cell selected from the cell list, a candidate list containing all of the sub-frequency groups of the same frequency set is displayed by the graphical user interface 50. This candidate list is sorted in increasing order of $I_{up\_cand\_eval}$, sub-sorted by orientation (for sectorized cells) and starting with the same orientation as the sub-frequency group for the selected cell. Candidate sub-frequency group information may be obtained through user interface 50 interaction concerning, for example, candidate sub-frequency group name, orientation, permission of the sub-frequency group, number of assigned/available frequencies, $I_{up\_cand\_eval}$, and presence of analog/digital control channel. The graphical user interface 50 further supports the highlighting of certain data in the candidate sub-frequency group list comprising:

show sub-frequency groups with either an analog or digital permission;

show sub-frequency groups with $I_{up\_cand\_eval}$ within a certain operator selected range;

show sub-frequency groups having a certain number of frequencies; and show sub-frequency groups either having or not having an analog or digital control channel frequency. Still further, upon selection of particular candidate sub-frequency group from the list, uplink interference information for each single frequency therein may be obtained through user interface 50 interaction comprising, for example, $I_{up\_cand\_freq\_eval}$.

Using the foregoing information available to the operator through manipulation of the graphical user interface 50, a proposal for the cell may be constructed and laid out in a cell definition list. Each proposal is labeled, and the sub-frequency groups comprising the proposal are identified. Information concerning the candidate sub-frequency groups in the proposal may be obtained through user interface 50 interaction concerning, for example, candidate sub-frequency group name, orientation, permission of the sub-frequency group, number of assigned/available frequencies, $I_{up\_cand\_eval}$, presence of analog/digital control channel and top/down/best frequency assignment type. Along with this information, the number of unassigned devices in each sub-frequency group are displayed.

During proposal definition, a sub-frequency group may be selected from the cell definition list and moved to the candidate list by actuating a delete feature. Furthermore, during proposal definition, a sub-frequency group may be selected from the candidate list and moved to the cell definition list by actuating an add feature. Furthermore, an exchanging of sub-frequency groups between the cell definition list and the candidate list by actuating a swap feature.

It is recognized that the frequencies within a sub-frequency group are typically used for only certain types of communications. Accordingly, each sub-frequency group is assigned with an operating permission tag defining the permitted types of communications for which the frequencies within the sub-frequency group may be used. For example, at a high level, the permission may relate to the permitted use of the frequencies within the sub-frequency group for certain modes of communication such as digital communications (i.e., digital control and/or traffic channels), analog communications (i.e., analog control and/or traffic channels), or dual mode communications (i.e., analog or digital). More precisely, the permission may permit additional or alternative use in connection with other modes of communication, such as facsimile transmission, cellular digital packet data (CDPD), asynchronous data transmission, and the like.

It is also recognized that most service providers/operators implement sectorized cells 10, and assign frequency groups (including sub-frequency groups) on a sector by sector basis. With frequency reuse, a corresponding frequency group is typically assigned to a correspondingly oriented sector in order to minimize the likelihood of interference. Accordingly, each frequency group is assigned with a tag relating to its orientation. This tag then identifies the preferred, but not necessarily required, sector orientation with which the frequency groups should be used. Orientation information may then be used for filtering and sorting activities.

It is still further recognized that certain frequencies are assigned for use with certain types of communications channels. For example, a frequency may be used in the cellular telephone system for an analog control channel (ACC). Another frequency may include a time slot dedicated for use as a digital control channel (DCC). Accordingly, each frequency is assigned with a tag specifying its channel assignment (e.g., ACC, DCC, analog traffic, digital traffic, or analog/digital traffic).

With reference once again to FIG. 2, following the creation of a proposal in the manner set forth above, a verification of the proposal may be obtained in connection with the step 108 evaluation calculation by implementing a frequency group mode validation (FGMV) functionality (step 140), an automatic frequency assignment (AFA) functionality (step 150) and a network validation (NV) check (step 160).

The frequency group mode validation functionality of step 140 determines whether the candidate sub-frequency groups within the proposal for a given cell are valid (i.e., they fit) with respect to the current configuration of that cell and in particular its base station. It is remembered here that the base station for each cell includes a plurality of transceivers (channel equipment) capable of operating independently on different assigned radio frequencies and with a given mode. The number and operating capabilities of the included transceivers define the current cell configuration.

Figure 4:
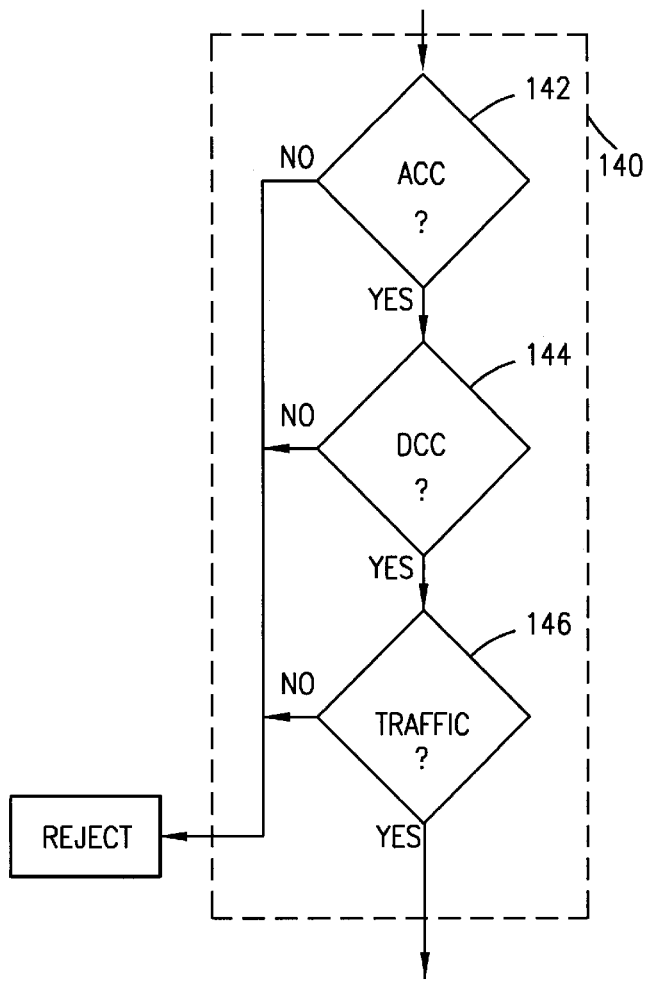
FIG. 4 is a flow diagram for a frequency group mode validation process within the procedure of FIG. 2.

The frequency group mode validation determination of step 140 is illustrated in FIG. 4 and involves first determining in step 142, whether the frequencies of the sub-frequency groups included in the proposal include a frequency having a tag specifying its channel as an analog control channel. Note, however, that this is a requirement only if the current cell configuration specifies the use of an analog control channel. Next, in step 144, a determination is made as to whether the sub-frequency groups included in the proposal include a digital control channel operating permission tag such that one of the frequencies therein either is specified, or could be specified, for use as a digital control channel. Note here that this is a requirement only if the current cell configuration specifies the use of a digital control channel. Finally, in step 146, a determination is made as to whether the sub-frequency groups included in the proposal include traffic channels with operating permission tags (analog, digital, data facsimile, CDPD, and the like) that satisfy the operating mode requirements of the included transceivers within the current cell configuration. This step 142 may further confirm that the sub-frequency groups of the proposal are approved for the sector orientations of the cell.

If the determination of either step 142, step 144 or step 146 is negative, then the proposal is rejected. Otherwise, if the determination of each step 142, 144, and 146 is affirmative, then the proposal passes frequency group mode validation testing.

Figure 5:
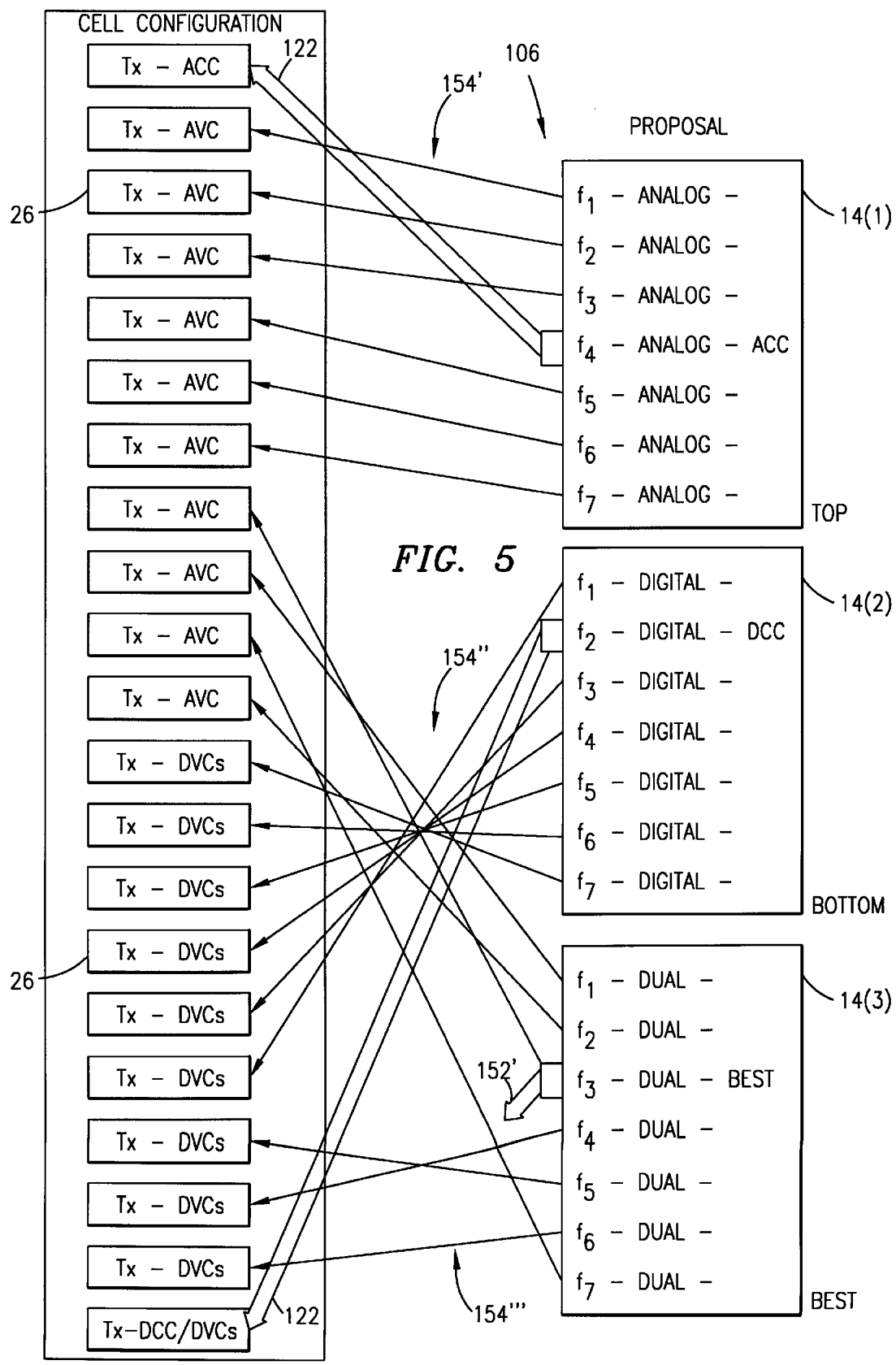
FIG. 5 is an illustration of an exemplary implementation of the frequency mode validation process and an automatic frequency assignment process.

The operation of the frequency group mode validation determination process (step 140) may be better understood by reference to a specific example illustrated in FIG. 5. On the left hand side of FIG. 5 is shown the current cell configuration for an exemplary cell including a plurality (twenty-one shown) of transceivers (TX) 26 providing an analog control channel (ACC), a plurality of analog voice (traffic) channels (AVCs), a plurality of digital voice (traffic) channels (DTCs), and a digital control channel (DCC). On the right hand side of FIG. 5 is shown a proposal that is being considered. Three candidate sub-frequency groups 14(1)–14(3) are included in the proposal. Each sub-frequency group 14(1)–14(3) includes seven frequencies f1–f7. It will, of course, be understood that each sub-frequency group may have as many frequencies as is desired including as few as one.

The cell configuration includes a transceiver 26 providing an analog control channel (ACC) Accordingly, step 142 is executed to determine whether the frequencies of the sub-frequency groups 14(1)–14(3) included in the proposal include a frequency having a tag specifying its channel as an analog control channel. In this case, the first sub-frequency group 14(1) has an operating permission tag of "analog", and one of its included frequencies $f_4$ is specified for use as an analog control channel ($f_{ACC}$).

The cell configuration includes a transceiver 26 providing a digital control channel (DCC). Accordingly, assuming that step 142 is passed, step 144 is executed to determine whether the frequencies of the sub-frequency groups 14(1)–14(3) included in the proposal include a frequency having a tag specifying its channel for use as a digital control channel. In this case, the second sub-frequency group 14(2) has an operating permission tag of "digital", and one of its included frequencies $f_2$ is specified for use as a digital control channel ($f_{DCC}$). If none of the included frequencies f specifies use as a digital control channel, the process determines whether any of the frequencies within either a digital or dual mode sub-frequency group could be specified for use as a digital control channel. This is illustrated in FIG. 5 by the identification of frequency $f_3$ in sub-frequency group 14(3) as the best frequency for potential use as a digital control channel ($f_{DCC}$).

The next step 146 of the frequency mode validation determination process determines whether the sub-frequency groups 14(1)–14(3) included in the proposal include enough traffic channels to match the operating mode requirements of the included transceivers 26. The current cell configuration requires ten analog traffic channels for the analog transceivers 26 and sufficient digital traffic channels for the ten digital transceivers. The process of step 146 identifies whether the proposal includes sub-frequency groups 14(n) having operating permission tags sufficient to meet the cell configuration requirements. For example, if the three sub-frequency groups 14(1)–14(3) of the proposal each had an operating permission tag of "analog" (not shown), the process of step 146 would be failed and the proposal rejected because the proposal could not satisfy the digital traffic channel needs of cell. Conversely, as shown, if the first sub-frequency group 14(1) had an operating permission tag of "analog", the second sub-frequency group 14(2) had an operating permission tag of "digital", and the third sub-frequency group 14(3) had an operating permission tag of "dual", the process of step 146 would be passed because the traffic channel needs of the cell could be met.

Figure 6:
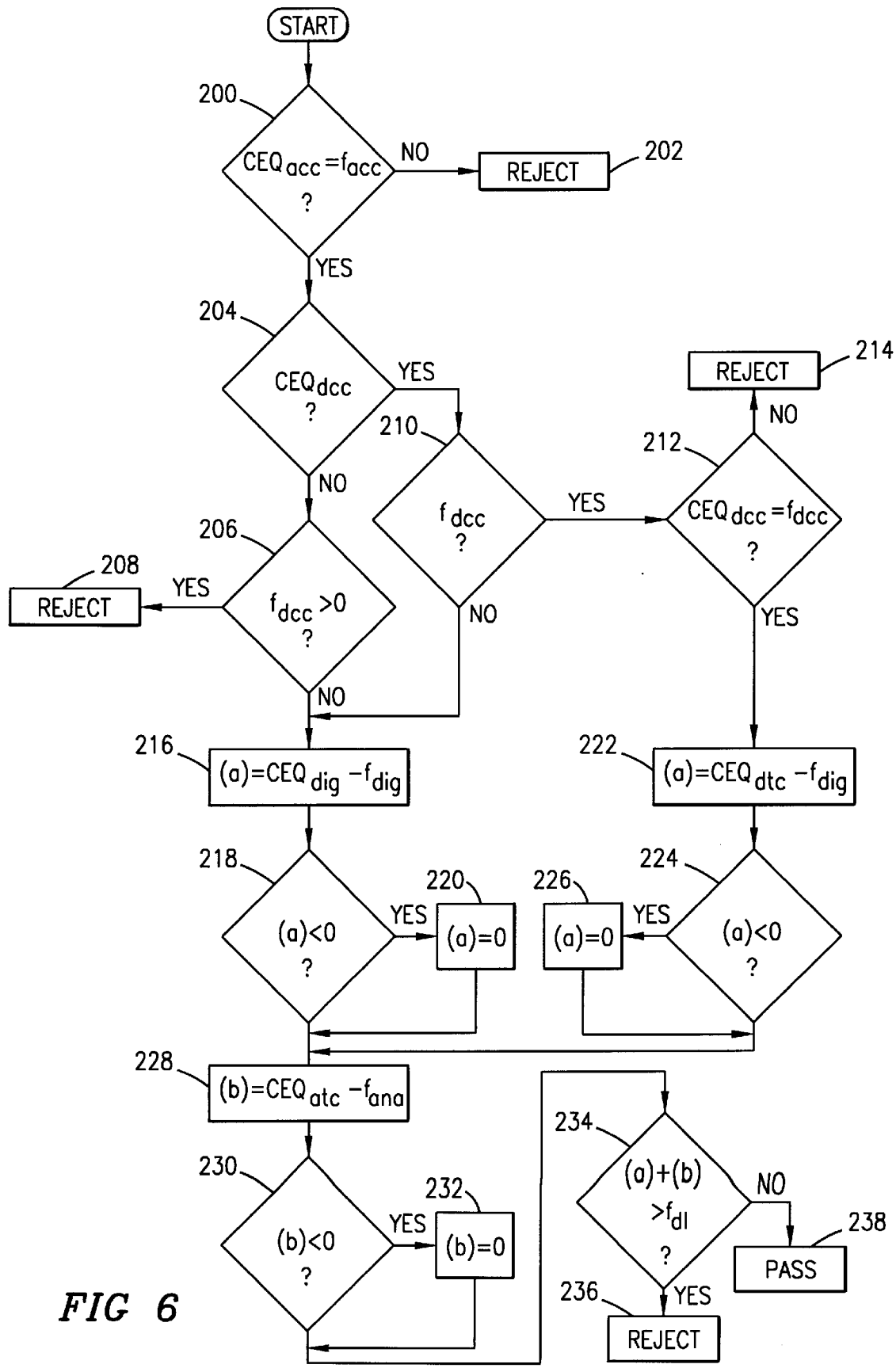
FIG. 6 is a flow diagram for a mathematical implementation of the frequency group mode validation process.

The frequency group mode validation process of step 140 may be mathematically represented and implemented as shown in the flow diagram of FIG. 6. The first step 200 is to determine whether the number of analog control channels (i.e., analog control channel specified transceivers) in the cell configuration ($CEQ_{acc}$) equals the total number of frequencies in the included sub-frequency groups of the proposal which have an analog control channel tag ($f_{acc}$) If not, the proposal is rejected in step 202. If yes, it is next determined in step 204 whether there are any digital control channels (i.e., digital control channel specified transceivers)

in the cell configuration ($CEQ_{dcc}$). If no, a determination is made in step 206 as to whether there are any frequencies in the included sub-frequency groups of the proposal which have a digital control channel tag ($f_{dcc}$). If yes, the proposal is rejected in step 208.

If the determination of step 204 is affirmative (i.e., there is a digital control channel in the cell configuration), a determination is made in step 210 as to whether the cell configuration specifies a digital control channel tag ($f_{dcc}$). If yes, it is desirable to enforce this tag, and a determination is made in step 212 as to whether the number of digital control channels (i.e., digital control channel specified transceivers) in the cell configuration ($CEQ_{dcc}$) equals the total number of frequencies in the included sub-frequency groups of the proposal which have a digital control channel tag ($f_{dcc}$) If not, the proposal is rejected in step 214.

If the determinations of either step 206 or step 210 are negative, the procedure next moves to step) 216 and calculates (a) the total number of digital specified transceivers ($CEQ_{dig}$) in the cell configuration minus the number of frequencies in the included sub-frequency groups of the proposal which have a digital operating permission tag ($f_{dig}$). If the result is negative (step 218), (a) is set equal to zero in step 220. If, on the other hand, the determination of step 212 is affirmative, the procedure instead moves to step 222 and calculates an alternative (a) which is the total number of digital traffic channel specified transceivers ($CEQ_{dtc}$) in the cell configuration minus the number of frequencies in the included sub-frequency groups of the proposal which have a digital operating permission tag ($f_{dig}$) If the result is negative (step 224), (a) is set equal to zero in step 226. Following the calculations of either steps 216–220 or steps 222–226, the procedure moves to step 228 to calculate (b) the total number of analog traffic channel specified transceivers ($CEQ_{atc}$) in the cell configuration minus the number of frequencies in the included sub-frequency groups of the proposal which have an analog operating permission tag ($f_{ana}$). If the result is negative (step 230), (b) is set equal to zero in step 232. The next step 234 is to determine if the sum of (a)+(b) is greater than the number of frequencies in the included sub-frequency groups of the proposal which have a dual operating permission tag ($f_{dl}$) and are capable of use as either a digital traffic channel or an analog traffic channel. If yes, the proposal is rejected in step 236. If no, the proposal passes (step 238) the frequency mode validation process of step 140.

Following rejection of the proposal by the frequency group mode validation process of step 140, the operator may return to the evaluation calculation step 108 of FIG. 2 to make further evaluations of the frequency groups and definition of proposals for verification.

Figure 7:
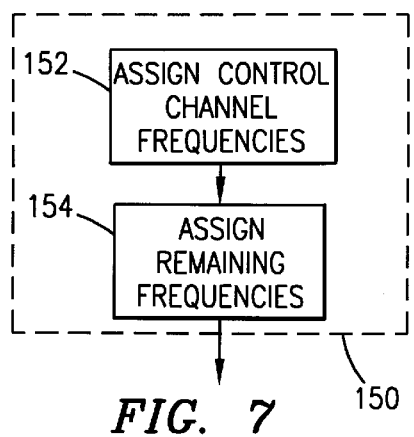
FIG. 7 is a flow diagram for the automatic frequency assignment process within the procedure of FIG. 2.

The purpose of the automatic frequency assignment of the frequencies within the candidate sub-frequency groups (step 150) is to distribute the frequencies within the candidate sub-frequency groups of the proposal to the transceivers of the current cell configuration. The automatic frequency assignment process is shown in FIG. 7 and involves first assigning in step 152 the frequencies relating to the transceivers for the control channels for the cell. With respect to the analog control channel for the cell, the assigned frequency is the frequency in a sub-frequency group of the proposal having a tag specifying its channel as an analog control channel. With respect to the digital control channel, the assigned frequency is the frequency in a sub-frequency group of the proposal having a tag specifying support of a digital control channel. If no such frequency exists, then the best (e.g., lowest uplink interference $I_{UP}$) frequency having a digital (or perhaps dual) operating permission tag is selected. Next, in step 154, the remaining frequencies within the sub-frequency groups of the proposal are assigned to the remaining transceivers for the cell. The order with which the assignments are made in step 154 is defined by a service provider/operator selected parameter. For example, the parameter may specify top, bottom or best for the assignment order. If top is specified, the frequencies are assigned from each sub-frequency group to a transceiver of the cell in accordance with their top to bottom numerical ordering within the sub-frequency group. If bottom is specified, the frequencies are assigned from each sub-frequency group to a transceiver of the cell in accordance with their bottom to top numerical ordering within the sub-frequency group. If best is specified, the frequencies are assigned from each sub-frequency group to a transceiver of the cell in accordance with the best (i.e., lowest uplink interference $I_{UP}$) available frequency. Of course, the assignment performed in step 154 takes into account the operating permission tags of the sub-frequency groups from which the frequencies are taken in view of the specified type of operation for the cell transceivers. Furthermore, it is understood that this assignment is still at this point hypothetical in that it has not yet been physically implemented through a retune of the cell. It will, of course be understood that unlike that shown in the example, not all frequencies within a given sub-frequency group may be assigned.

The operation of the automatic frequency assignment process (step 150) may be better understood by reference again to the specific example illustrated in FIG. 5. In step 152, the frequencies f of the sub-frequency groups 14(1) and 14(2) specified for use as the analog control channel ($f_{ACC}$) and digital control channel ($f_{DCC}$) are assigned to the appropriate corresponding transceivers 26. If no digital control channel frequency ($f_{DCC}$) is specified in one of the sub-frequency groups 14(1)–14(3), the frequency within a sub-frequency group 14(n) having either a "digital" or "dual" operating permission tag, and having the best (i.e., lowest) uplink interference $I_{UP}$, is selected (step 152') for use as the digital control channel. Next, the remaining frequencies within the sub-frequency groups 14(1)–14(3) are assigned 154 to the remaining transceivers 26 of the cell configuration, taking into account the (operating permission tags of the sub-frequency groups from which the frequencies are taken in view of the specified type of operation for the transceivers. The order with which this operation occurs may comprise one of three ways. First, as illustrated for purposes of this example in the context of sub-frequency group 14(1), the frequencies are assigned 154' to the transceivers 26 in accordance with their top to bottom numerical ordering within the sub-frequency group. Second, as illustrated for purposes of this example in the context of sub-frequency group 14(2), the frequencies are assigned 154" to the transceivers 26 in accordance with their bottom to top numerical ordering within the sub-frequency group. Third, as illustrated for purposes of this example in the context of sub-frequency group 14(3), the frequencies are assigned 154'" to the transceivers 26 in accordance with the best to worst (i.e., lowest to highest uplink interference $I_{UP}$) available frequency.

Figure 8:
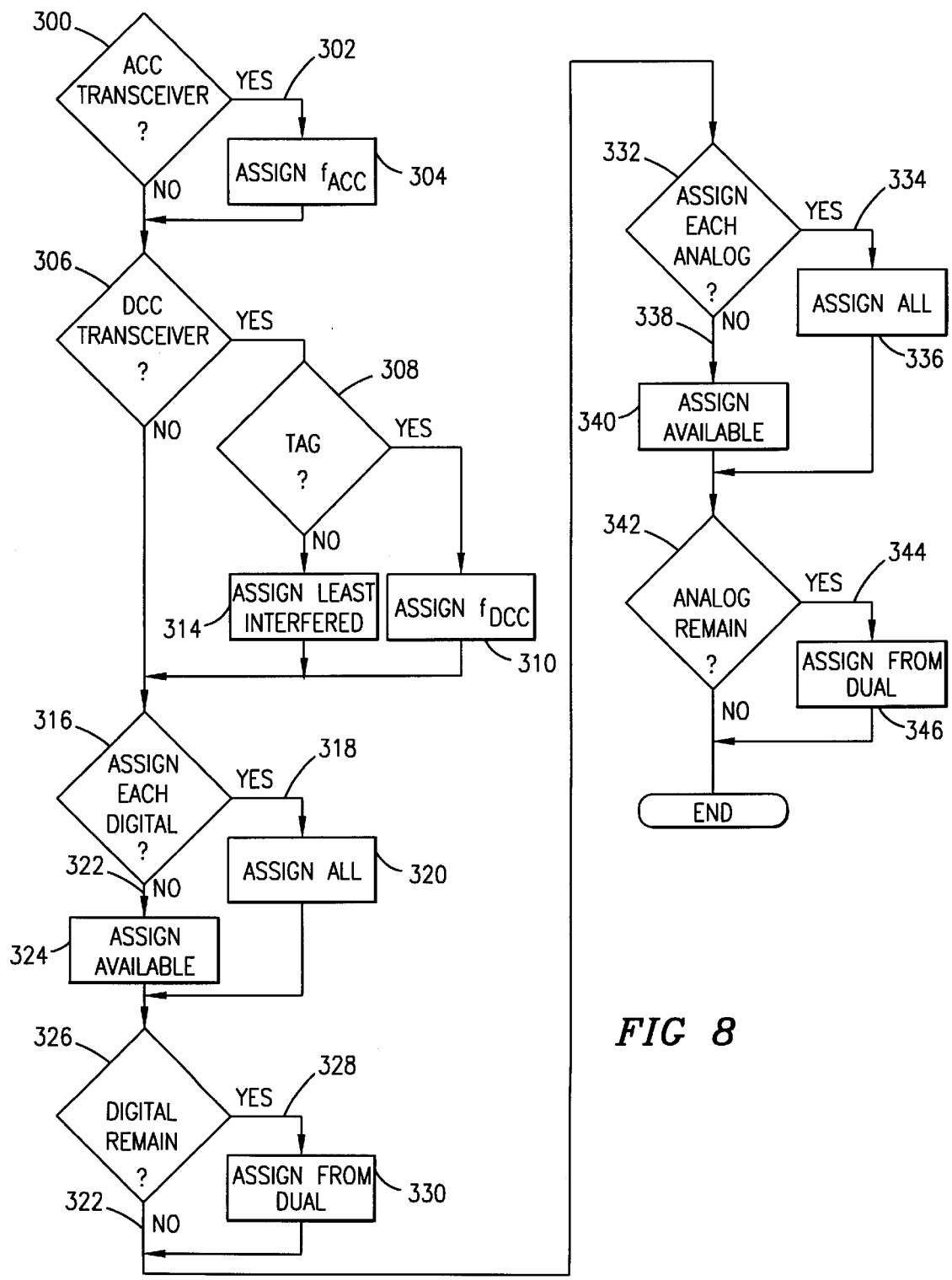
FIG. 8 is a flow diagram for an implementation of the automatic frequency assignment process.

A more detailed presentation of the automatic frequency assignment process of step 150 is shown in the flow diagram of FIG. 8. First, a determination is made in step 300 as to whether the cell contains a transceiver designated for analog control channel use. If yes (path 302), the frequency having a tag specifying its channel as an analog control channel ($f_{ACC}$) is assigned to that transceiver in step 304. Next, a determination is made in step 306 as to whether the cell contains a transceiver designated for digital control channel use. If yes, a determination is made in step 308 as to whether a frequency in the proposal has a tag specifying its channel for use as a digital control channel ($f_{DCC}$) If yes, that frequency is assigned to the digital control channel transceiver in step 310. If no, the best frequency from the least interfered of the sub-frequency groups having either a digital or dual operating permission tag is assigned to that transceiver in step 314. Next, the assignment step 154 of FIG. 7 is performed as follows. First, for each sub-frequency group having a digital operating permission tag, a determination is made in step 316 as to whether each transceiver designated for digital operation can receive a frequency from a sub-frequency group with a digital operating permission. If yes (path 318), these frequencies are assigned in accordance with the user specified order parameter (top to bottom, bottom to top, or best to worst) to the digital transceivers in step 320. If no (path 322), the frequencies of the sub-frequency group are assigned in accordance with the specified order to the available digital transceivers in step 324. Next, a determination is made in step 326 as to whether any digital transceivers remain which have not yet been assigned a frequency. If yes (path 328), frequencies are assigned to these transceivers from sub-frequency group(s) having a dual operating permission tag in step 330. If digital operation for the cell is preferred, this assignment is made from the least interfered of the dual mode sub-frequency groups. Otherwise, if analog operation is preferred, this assignment is made from the most interfered of the dual mode sub-frequency groups. Next, for each sub-frequency group having an analog operating permission tag, a determination is made in step 332 as to whether each transceiver designated for analog operation can receive a frequency from a sub-frequency group having an analog operating permission. If yes (path 334), these frequencies are assigned in accordance with the user specified order parameter (top to bottom, bottom to top, or best to worst) to the analog transceivers in step 336. If no (path 338), the frequencies of the sub-frequency group are assigned in accordance with the specified order to the available analog transceivers in step 340. Next, a determination is made in step 342 as to whether any analog transceivers remain which have not yet been assigned a frequency. If yes (path 344), frequencies are assigned to these transceivers from sub-frequency group(s) having a dual operating permission tag in step 346. If analog operation for the cell is preferred, this assignment is made from the least interfered of the dual mode sub-frequency groups. Otherwise, if digital operation is preferred, this assignment is made from the most interfered of the dual mode sub-frequency groups.

The proposals are further submitted for a network validation check in step 160 to determine whether any adverse consequences to the network might arise from an actual (i.e., physical as opposed to hypothetical) implementation of the proposal. The primary purposes of this procedure are to prevent two cells, within a certain operator definable distance, from substantially simultaneously implementing proposals which would involve: a) a switch to the same sub-frequency group; b) a switch from the same sub-frequency group; c) a switch to adjacent sub-frequency groups; and d) a switch from adjacent sub-frequency groups. The additional purposes of this procedure are to prevent two cells, within a certain operator definable distance, from substantially simultaneously implementing proposals where: e) one cell is switching from and the other cell is switching to the same sub-frequency group; f) one cell is switching to and the other cell is switching from the same sub-frequency group; g) one cell is switching from and the other cell is switching to adjacent sub-frequency groups; and, h) one cell is switching to and the other cell is switching from adjacent sub-frequency groups.

Figure 9:
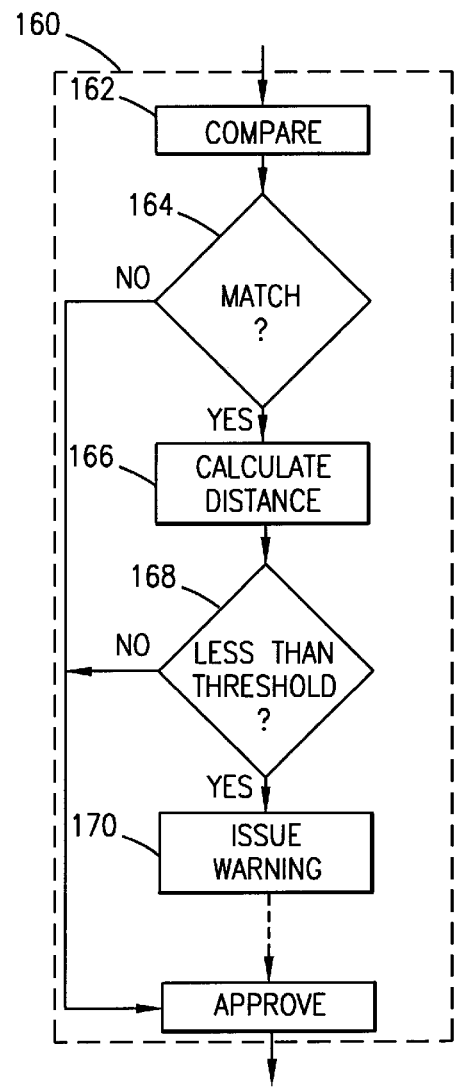
FIG. 9 is a flow diagram for a network validation check process within the procedure of FIG. 2.

The network validation check of step 160 is illustrated in FIG. 9. A proposal being made with respect to a certain cell is compared in step 162 against a record previously implemented proposals. The record stores these implemented proposals back only for a certain defined time period. A test is then made in step 164 as to whether there are any entries in the record which have either: a "from" sub-frequency group identifier that is the same as or is adjacent to a "from" sub-frequency group identifier in the current proposal; a "to" sub-frequency group identifier that is the same as or is adjacent to a "to" sub-frequency group identifier in the current proposal; a "from" sub-frequency group identifier that is the same as or is adjacent to the "to" sub-frequency group identifier in the current proposal; or, a "to" sub-frequency group identifier that is the same as or is adjacent to the "from" sub-frequency group identifier in the current proposal. The foregoing description assumes that all of the cells in the service area are allocated frequency in accordance with the same process for identifying sub-frequency groups. In instances where similarly identified sub-frequency groups do not necessarily include the same frequencies, the test of step 164 determines whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency group that is the same as or is adjacent to a frequency in the identified "from" sub-frequency group in the current proposal.

If the answer to the determination in step 164 is affirmative, then a calculation is made in step 166 of the distance between the cell of the current proposal and the cell of the matching proposal in the record. The calculated distance is then compared in step 168 to a threshold distance. It should be noted here that in the instance of a layered cell structure, the threshold distance may be different for umbrella (macro) cells, micro cells and pico cells, or any combination thereof. Furthermore, different threshold distances may be specified for the same and adjacent sub-frequency group analyses. If the calculated distance is less than the threshold, the cells are too close to each other and a warning is issued in step 170 that the proposal at issue may have adverse consequences to the network if implemented. It should be noted, however, that the warning may still be ignored, and the proposal approved for either pre-update verification or a system retune (see, FIG. 2). Alternatively, operation may be implemented to automatically reject the proposal if the distance is too close. If there is no match in step 164 or the distance is greater than the threshold in step 168, then the proposal is approved by the network validation check. The proposal is then accepted and becomes a part of a record.

Figure 10:
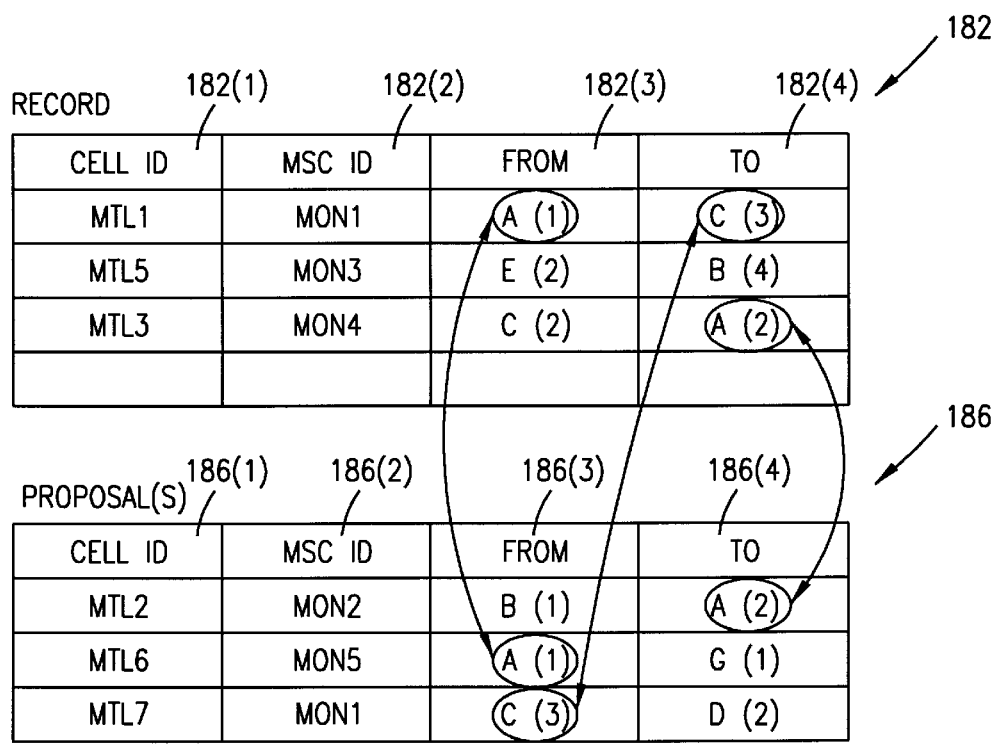
FIG. 10 is an illustration of an exemplary implementation of the network validation check process.

The operation of the network validation check process (step 160) may be better understood by reference to a specific example illustrated in FIG. 10. At the top of FIG. 10 is shown the record 182 of previously approved proposals.

The record 182 indicates for each approved proposal, the identification 182(1) of the cell 10 which made the request, the identification 182(2) of the mobile switching center 22 to which that cell is assigned, the identification 182(3) of the sub-frequency group 14(n) from which a change was requested (i.e., the selected sub-frequency group that was dropped), and the identification 182(4) of the sub-frequency group 14(n) to which a change was requested (i.e., the candidate sub-frequency group that was added). The record may include other information of interest (not shown) such as an identification of the proposal that resulted in the recorded change, the current status (i.e., planned, deployed, or the like) of the proposal, and the date of implementation.

In the present example, only three previously approved proposals are included in the record 182. The first previously approved proposal was made on behalf of cell 10 MTL1 belonging to mobile switching center 22 MON1 with respect to a change from sub-frequency group 14(n) A(1) to C(3). The second previously approved proposal was made on behalf of cell 10 MTL5 belonging to mobile switching center 22 MON3 with respect to a change from sub-frequency group 14(n) E (2) to B(4). The third previously approved proposal was made on behalf of cell 10 MTL3 belonging to mobile switching center 22 MON4 with respect to a change from sub-frequency group 14(n) C(2) to A(2).

At the bottom of FIG. 10 are shown the proposals which are now being submitted for the network validation check of step 160. Like the record 182, the proposals include an identification 186(1) of the cell 10 for which the proposal is being submitted, an identification 186(2) of the mobile switching center 22 to which that cell is assigned, an identification 186(3) of the selected sub-frequency group 14(n) that the proposal requests be dropped, and an identification 186(4) of the candidate sub-frequency group 14(n) that the proposal requests be added.

In the present example, three proposals are currently under scrutiny with respect to the network validation check 160. The first proposal is being made on behalf of cell 10 MTL2 belonging to mobile switching center 22 MON2 with respect to a change from sub-frequency group 14(n) B(1) to A(2). The second proposal is being made on behalf of cell 10 MTL6 belonging to mobile switching center 22 MON5 with respect to a change from sub-frequency group 14(n) A(1) to G(1). The third proposal is being made on behalf of cell 10 MTL7 belonging to mobile switching center 22 MON 1 with respect to a change from sub-frequency group 14(n) C(3) to D(2).

The proposals are taken up for consideration by the network validation check 160 on a first come, first served, basis. Other implementations for considering the proposal may alternatively be used. The comparison of step 162 first involves testing in step 164 whether there are any entries in the record 182 which have either: a "from" sub-frequency group identifier 182(3) that is the same as or is adjacent to a "from" sub-frequency group identifier 186(3) in the proposal at issue; a "to" sub-frequency group identifier 182(4) that is the same as or is adjacent to a "to" sub-frequency group identifier 182(4) in the proposal at issue; a "from" sub-frequency group identifier that is the same as or is adjacent to the "to" sub-frequency group identifier in the proposal at issue; or, a "to" sub-frequency group identifier that is the same as or is adjacent to the "from" sub-frequency group identifier in the proposal at issue. With respect to the first proposal at issue, a match is found because its "to" sub-frequency group identifier 186(4) is the same as the "to" sub-frequency group identifier 182(4) of the third previously approved proposal stored in the record 182.

Again, it is recognized that this process example assumes that all of the cells in the service area are allocated frequencies in accordance with the same process for identifying sub-frequency groups. If this were not the case, the test of step 164 would instead determine whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency group that is the same as or is adjacent to a frequency in the identified "from" sub-frequency group in the current proposal.

Having satisfied the test of step 164, a calculation is then made in step 166 of the distance d between cell 10 MTL2 (belonging to mobile switching center 22 MON2) and cell MTL3 (belonging to mobile switching center 22 MON4). If the distance d is less than a certain threshold (which may take into account layered cell structures) as determined in step 168, a warning is issued in step 170 that the proposal at issue may have adverse consequences to the network if implemented.

With respect to the second proposal at issue, a match is also found because its "from" sub-frequency group identifier 186(3) is the same as the "from" sub-frequency group identifier 182(3) of the first previously approved proposal stored in the record 182. A similar step 166 distance calculation and step 168 threshold comparison process is then performed with respect to cell 10 MTL6 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first proposal were thereafter approved, it would be added to the record 182, and the process would have to take the first proposal into consideration when evaluating the second proposal.

With respect to the third proposal at issues, a match is also found because its "from" sub-frequency group identifier 186(3) is the same as the "to" sub-frequency group identifier 182(3) of the first previously approved proposal stored in the record 182. A similar step 166 distance calculation and step 168 threshold comparison process is then performed with respect to cell 10 MTL7 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first or second proposal were thereafter approved, it would be added to the record 182, and the process would have to take the first and/or proposal into consideration when evaluating the third proposal.

It is recognized again that the proposal may, following completion of the frequency group mode validation functionality, automatic frequency assignment functionality and network validation functionality checks, be validated against certain rules (e.g., mobile network configuration rules relating to channel separation, potential intermodulation products, and data required for hand-off).

With reference once again to FIG. 2, attention is next directed to the process for measuring downlink interference of step 114. It is noted that the radio statistics measurements made in step 106 and analyzed in step 108 for the purpose of proposal definition fail to take into consideration the existence of interference on the downlink. Such interference should preferably be considered before making any changes in the frequency plan. Accordingly, the system requests mobile stations 20 to make downlink interference measurements (in step 114) on each of the individual frequencies within the candidate sub-frequency groups for each of the stored proposals. The downlink interference measurements on these individual frequencies are preferably made by the mobile stations 20 in the normal course of operation where mobile assisted handoff (MAHO) measurements are made and reported. These measurements are advantageously utilized in connection with both the pre-update verification calculations of step 116 and the post-update verification calculations of step 122.

Turning next to the pre-update verification calculations of step 116, the following are also calculated:

(a) $I_{up\_old\_pre}$: the uplink interference value for each cell for which pre-update verification was requested, calculated using only the old sub-frequency groups to be changed with the average weighted by the number of frequencies in each sub-frequency group;

(b) $I_{up\_new\_w\_pre}$: the uplink interference value for each cell for which pre-update verification was requested, calculated using only the proposed new sub-frequency groups with the average weighted by the number of frequencies in each sub-frequency group; and (c) $I_{dn\_new\_w\_pre}$: the downlink interference value for each cell for which pre-update verification was requested, calculated using only the proposed new sub-frequency groups with the average weighted by the number of frequencies in each sub-frequency group.

Reference is once again made to FIG. 3. Utilizing the graphical user interface 50 of the frequency planning tool 40, an operator may view the (a)–(c) results of the FIG. 2, step 116 evaluation process on a pre-update verification confirmation list. For example, concerning an operator selected proposal identified on the pre-update verification confirmation list for which pre-update verification was requested, information may be obtained through user interface 50 interaction concerning, for example, cell name, $I_{up\_old\_w\_pre}$, $I_{up\_new\_w\_pre}$, $I_{dn\_new\_w\_pre}$, status of proposal, and whether post update verification has been requested. Through further operator interaction with the graphical user interface 50, a cell in the pre-update verification confirmation list may be selected, and the operator given the option, on a per cell basis, to:

confirm proposed changes to the cell (note that only one confirmation per cell is allowed);

delete a proposal from the list;

expand a selected cell to provide the operator with further pertinent information comprising, for example, $I_{up\_sel\_pre}$ for each selected sub-frequency group in the proposal, and $I_{up\_cand\_pre}$ and $I_{dn\_cand\_pre}$ for each candidate sub-frequency group in the proposal;

perform a manual frequency assignment;

validate the confirmed proposals from the pre-update verification confirmation list against certain validation rules (e.g., mobile network configuration check rules concerning channel separation, potential for intermodulation products, and data required for hand-off); and request a network update to be performed in accordance with a confirmed proposal.

Reference is once again made to FIG. 2. Following operator request to have a network update performed with respect to a confirmed proposal (either after the evaluation calculation of step 108 or the pre-update verification calculation of step 116), the network is retuned through the implementation of a network update in step 112. The operator has the option through further interaction with the graphical user interface 50 (see, FIG. 3) to schedule, on a per confirmed proposal basis, the time and date at which the update is to be performed. In connection with the performance of the update in step 112, updates, when required, in cooperating mobile switching centers are also effectuated. For example, if a frequency change is ordered in a border cell, the cooperating mobile switching center is provided with new channel number information, border cell selection data, digital locating data and bordering cell data. Furthermore, certain channel equipment for cells implicated in the retune is manually blocked before a frequency change is ordered. For frequency agile devices, the original state of the device is returned following the frequency change. For non-frequency agile devices, the devices remain blocked after the change, and the operator is provided with an appropriate notice. As a further alternative, it is possible to have the update printed out in hard copy format for manual implementation.

Turning next to the post-update verification calculations of step 122, the following are also calculated for each cell for which post-update verification was requested:

(a) $I_{up\_old\_w\_eval}$: the uplink interference value calculated using only the old selected sub-frequency groups with the average weighted by the number of frequencies in each sub-frequency group;

(b) $I_{up\_new\_w\_eval}$: the uplink interference value calculated using only the new selected sub-frequency frequency groups with the average weighted by the number of frequencies in each sub-frequency group;

(c) $BER_{up\_w\_eval}$: the average uplink bit error rate for the old selected sub-frequency groups with the average weighted by the number of frequencies in each sub-frequency group;

(d) $BER_{dn\_w_{13}\_eval}$: the average downlink bit error rate for the old selected sub-frequency groups with the average weighted by the number of frequencies in each sub-frequency group;

(e) $I_{up\_new\_w\_post}$: the uplink interference value calculated using only the new selected sub-frequency groups with the average weighted by the number of frequencies in each sub-frequency group;

(f) $I_{up\_old\_w\_post}$: the uplink interference value calculated using only the old selected sub-frequency groups with the average weighted by the number of frequencies in each sub-frequency group;

(g) $I_{dn\_cand\_post}$: the average downlink interference value for the old selected sub-frequency group calculated from the average of the extra MAHO measurement for all included frequencies;

(h) $I_{dn\_old\_w\_post}$: the downlink interference value calculated using only the average downlink interference values for old selected sub-frequency groups with the average weighted by the number of frequencies in each sub-frequency group;

(i) $BER_{up\_w\_post}$: the average uplink bit error rate for the new selected sub-frequency groups using post-update data with the average weighted by the number of frequencies in each sub-frequency group; and (j) $BER_{dn\_w\_post}$: the average downlink bit error rate for the new selected sub-frequency groups using post update data with the average weighted by the number of frequencies in each sub-frequency group. In addition, for each cell where a post-update verification was requested, the following calculations are made for each co-channel cell before the frequency change:

(k) $I_{up\_sel\_w\_cobef}$: the uplink interference value calculated using radio environment statistics measurements in the co-channel cell before the network update; and (l) $I_{up\_sel\_w\_coaft}$: the uplink interference value calculated using radio environment statistics measurements in the co-channel cell after the network update.

Furthermore, for each cell where a post-update verification was requested, the following calculations are made for each co-channel cell after the frequency change:

(m) $I_{up\_sel\_w\_cobef}$: the uplink interference value calculated using radio environment statistics measurements in the co-channel cell before the network update; and (n) $I_{up\_sel\_w\_coaft}$: the uplink interference value calculated using radio environment statistics measurements in the co-channel cell after the network update.

In addition, for each cell where a post-update verification was requested, the following calculations are made for each adjacent-channel cell before the frequency change:

(o) $I_{up\_sel\_w\_adjbef}$: the uplink interference value calculated using radio environment statistics measurements in the adjacent-channel cell before the network update; and (p) $I_{up\_sel\_w\_adjaft}$: the uplink interference value calculated using radio environment statistics measurements in the adjacent-channel cell after the network update.

Furthermore, for each cell where a post-update verification was requested, the following calculations are made for each adjacent-channel cell after the frequency change:

(q) $I_{up\_sel\_w\_adjbef}$: the uplink interference value calculated using radio environment statistics measurements in the adjacent-channel cell before the network update; and (r) $I_{up\_sel\_w\_adjaft}$: the uplink interference value calculated using radio environment statistics measurements in the adjacent-channel cell after the network update.

Reference is once again made to FIG. 3. Utilizing the graphical user interface 50 of the frequency planning tool 40, an operator may view the (a)–(r) results of the FIG. 2, step 122 evaluation process. A changed cell list may be presented on the graphical user interface for operator consideration. This changed cell list identifies the following information:

cell name;

number of assigned frequencies;

improvement ($I_{up\_old\_w\_post}$–$I_{up\_new\_w\_post}$);

expected improvement ($I_{up\_old\_w\_eval}$–$I_{up\_new\_w\_eval}$);

uplink/downlink bit error rate comparison for both pre and post update; and uplink/downlink interference comparison for both pre and post update.

An individual cell in the changed cells list may be selected by the operator through the graphical user interface 50 to generate a list of co-channel cells prior to network update and a list of co-channel cells after network update, wherein the co-channel cells are within a predetermined distance of the selected cell. The co-channel before list identifies cell name, uplink interference level before change, uplink interference level after change, and an interference enhancement resulting from the change. The co-channel after list similarly identifies cell name, uplink interference level before change, uplink interference level after change, and an interference enhancement resulting from the change. This list may be specified to include only those cells within an operator definable distance of a certain cell. An individual cell in the changed cells list may selected by the operator through the graphical user interface 50 to generate a list of adjacent-channel cells prior to network update and a list of adjacent-channel cells after network update, wherein the adjacent-channel cells are within a predetermined distance of the selected cell. The adjacent-channel before list identifies cell name, uplink interference level before change, uplink interference level after change, and an interference enhancement resulting from the change. The adjacent-channel after list similarly identifies cell name, uplink interference level before change, uplink interference level after change, and an interference enhancement resulting from the change. This list may be specified to include only those cells within an operator definable distance of a certain cell.

Through further operator interaction with the graphical user interface 50, a cell in the changed cells list may be selected, and the operator given the option, on a per cell basis, to:

confirm the deployed changes to the cell;

roll-back the cell to its original state using either a partial roll-back (wherein only a selected cell is rolled back), or a full roll-back (wherein all of the cells changed in the current activity are rolled back);

generate a pair of lists for the cell, a first list containing interference and bit error rate information for the old sub-frequency group assigned to that cell, and a second list containing interference and bit error rate information for the new sub-frequency group assigned to that cell;

validate the proposed changed cells list in the event of a roll-back against certain validation rules (e.g., mobile network configuration check rules) as well as perform a network validation check; and apply the actions taken in post-update verification to either deploy the roll-back or complete the update.

Reference is once again made to FIG. 3. As discussed above, the graphical user interface 50 of the frequency planning tool 40 provides a user friendly interface in a frequency reallocation editor (FRE) 60 feature for supporting operator analysis of the data generated by the evaluation calculation of step 108, the pre-update verification calculation of step 116 and the post-update verification calculation of step 122 (see, FIG. 2) The graphical user interface 50 further supports operator definition of proposals, and the selection of proposals for pre-update verification, update, post-update verification, and roll-back. Three additional features, however, are also provided to the operator through the graphical user interface 50.

A first additional feature is a frequency set display (FSD) 70 feature. Using the frequency set display feature, the operator may manage the frequency plan for the network (taking into account the various hyperbands implicated by the network). As an example, default support for 7/21 and 4/12 frequency plans is provided for 800 MHz hyperband networks, while default support for 7/21 and 9/27 frequency plans is provided for 1900 MHz hyperband networks. Of course, through the user friendly interface of the frequency set display feature, other frequency plans may be defined. The frequency set display feature supports user creation of a frequency set through the graphical user interface 50 by allowing for the selection of a hyperband, the selection of one or more specific frequency band(s) from amongst those available to the selected hyperband, and the specification of the number of sectors and the number of frequency groups per sector. Using the graphical user interface 50, the operator may define the frequency content of the sub-frequency groups (by, for example, assigning frequencies to sub-frequency groups, dividing and joining sub-frequency groups, and assigning analog, digital or dual mode permission to sub-frequency groups) The operator may further tag a frequency from one of the sub-frequency groups with a permission to be used only with an analog control channel (provided the sub-frequency group has analog mode permission). The graphical user interface 50 further supports operator tagging of a frequency from one of the sub-frequency groups with a permission to be used only with a digital control channel (provided the sub-frequency group has digital mode permission).

A second additional feature is a graphical cell display (GCD) 80 feature. Using the graphical cell display feature, the operator may graphically view frequency reallocation activity in the network. For example, in one graphical presentation format, a certain cell or collection of cells of interest to the operator are displayed overlaid on top of a geographical map of the service area covered by the network (showing, for example, roads, bodies of water, demographic data, and the like). Visual discrimination techniques (such as, for example, shape, color or shading charges) are utilized to present the status, value and item related information concerning network operation in a more user friendly manner. As an example, different types of cells (macro, micro, and pico) as graphically presented using different geometric shapes. Performance related data (presented in hard number format through the frequency reallocation editor feature described above) is graphically presented, for example, by differentiating on the basis of measured interference by color changes.

A number of display options are available. A first option, referred to as a global option, displays the results of interest to the operator for all cells in one or more mobile switching centers implicated in a frequency reallocation activity. Using this option, the operator may view through the graphical cell display 80 feature of the graphical user interface the following:

the overall and worst uplink interference levels for all selected sub-frequency groups, with each range of interference resulting in a different colored cell;

the overall and worst uplink bit error rate for all selected sub-frequency groups, with each range of error rate resulting in a different colored cell;

the overall and worst downlink bit error rate for all selected sub-frequency groups, with each range of error rate resulting in a different colored cell;

all co-channel cells for a given selected cell (with filtering available for supervisory audio tone, digital color code and digital voice channel color code); and all cells utilizing a selected sub-frequency group (with filtering available for supervisory audio tone, digital color code and digital voice channel color code).

A second option, referred to as the impact option, displays the results of interest to the operator for all cells implicated in a selected frequency reallocation activity. Using this option, the operator may view through the graphical cell display 80 feature of the graphical user interface 50 the following:

expected interference improvement at evaluation with each range of improvement resulting in a different colored cell;

expected interference improvement at pre-update verification with each range of improvement resulting in a different colored cell;

actual interference improvement with each range of improvement resulting in a different colored cell;

comparisons of uplink versus downlink interference with each range of interference difference resulting in a different colored cell;

all co-channel cells in the proposal for a given selected cell (with filtering available for supervisory audio tone, digital color code and digital voice channel color code);

co-channel interference improvement for cells that were co-channel cells before the update with each range of improvement resulting in a different colored cell; and co-channel interference deterioration for cells that became co-channel cells after the update with each range of deterioration resulting in a different colored cell.

A third feature of the frequency planning tool 40 is a report generation feature 90. These reports graphically present frequency reallocation data allowing the operator to observe the impact that retunes have on the network. In general, the following reports are made available: an interference report for selected and/or candidate sub-frequency groups on a cell basis; a spectrum report for all frequencies on a cell basis; an interference cumulative distribution function report for selected frequencies; and an interference trend report for selected frequencies in a mobile switching center. More specifically, the reports generated using the feature 90 including:

a bar chart report showing the uplink interference level for all measured frequencies (candidate and selected) in a cell on a sub-frequency group basis. For the selected sub-frequency group, the measurements from the voice channels shall be used. On the same report, the average cell uplink interference level (for the selected frequencies) shall also be plotted. The report may be limited to a certain measurement period and/or to a certain selected cell;

a line chart report showing the uplink interference level of each measured selected and/or candidate frequency in a cell. On the same report, the average cell uplink interference level (for the selected frequencies) is also shown. The standard deviation, as well as the mean, maximum and minimum values of the selected frequencies are provided. The report may be limited to a certain measurement period and/or to a certain selected cell;

a bar chart report showing the uplink interference level of each selected frequency in a cell. On the same report, the average cell uplink interference level (for the selected frequencies) is also shown. The standard deviation, as well as the mean, maximum and minimum values of the selected frequencies are provided. The report may be limited to a certain measurement period and/or to a certain selected cell;

a line chart report showing the cumulative distribution function of $I_{up\_sel\_w}$ for all cell measurements for cells of a given cell coverage in a mobile switching center. The function is calculated from the average uplink interference measurements of selected frequencies, and is generated using measurement data for any combination of cells that have the given cell coverage. The report may be limited to a certain measurement period; and a trend report showing the trend of the average uplink interference for all selected frequencies on a user definable number of cells or on a mobile switching center basis and for a user definable measurement period. Note here that an operator may also generate custom reports from the collected measurement data.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A method for making a revision to a frequency plan assignment for a cellular communications network, comprising the steps of:
    making radio environment statistics measurements concerning the network;
    evaluating the radio environment statistics measurements to define at least one retune proposal for at least one cell;
    making downlink interference measurements;
    repeating the radio environment statistics measurements;
    evaluating the retune proposal in view of the downlink interference measurements and repeated radio environment statistics measurements to select a single retune proposal per cell for implementation;
    implementing the selected retune proposal to effectuate a retune of the network;
    repeating the downlink interference measurements;
    again repeating the radio environment statistics measurements;
    evaluating the implemented retune proposal in view of the repeated downlink interference measurements and again repeated radio environment statistics measurements to confirm efficacy of implemented retune proposal to reduce network interference; and
    rolling back of the implemented retune proposal in the event network interference is not satisfactorily reduced.

2. The method as in claim 1 wherein the step of evaluating the radio environment statistics measurements to define at least one retune proposal for at least one cell comprises the steps of:
    determining whether each retune proposal is compatible with a current cell configuration for that at least one cell; and
    rejecting any retune proposal which is incompatible.

3. The method as in claim 2 wherein the current cell configuration is defined in part by a need for an analog control channel, and wherein the step of determining compatibility comprises the step of:
    confirming that the retune proposal includes a frequency for supporting that analog control channel.

4. The method as in claim 2 wherein the current cell configuration is defined in part by a need for a digital control channel, and wherein the step of determining compatibility comprises the step of:
    confirming that the retune proposal includes a frequency for supporting that digital control channel.

5. The method as in claim 2 wherein the current cell configuration is defined in part by a need to support certain modes of operation, and wherein the step of determining compatibility comprises the step of:
    confirming that the retune proposal includes enough frequencies for supporting traffic channel requirements of the certain modes of operation.

6. The method as in claim 2 wherein the current cell configuration is defined in part by a need for a control channel and by a need to support certain modes of operation, and wherein the step of determining compatibility comprises the steps of:
    confirming that the retune proposal includes a frequency for supporting the needed control channel; and
    confirming that the retune proposal includes enough frequencies for supporting traffic channel requirements of the certain modes of operation.

7. The method as in claim 6 wherein the control channel comprises at least one of an analog control channel and a digital control channel.

8. The method as in claim 6 wherein the certain modes of operation comprises at least one of an analog voice traffic, a digital voice traffic, and data traffic.

9. The method as in claim 1 wherein the step of evaluating the radio environment statistics measurements to define at least one retune proposal for at least one cell comprises the step of:
    assigning frequencies from each retune proposal to transceivers in the at least one cell.

10. The method as in claim 9 wherein the step of assigning comprises the steps of:
    first assigning frequencies for control channels in the retune proposal to control channel ones of the transceivers; and
    next assigning frequencies for traffic channels in the retune proposal to traffic channel ones of the transceivers.

11. The method as in claim 1 wherein the step of evaluating the radio environment statistics measurements to define at least one retune proposal for at least one cell comprises the steps of:
    determining whether there would be any adverse effect on the network if the retune proposal should be implemented; and
    rejecting any retune proposal which adversely affects.

12. The method as in claim 11 wherein the step of determining whether there would be any adverse effect on the network if the retune proposal should be implemented comprises the step of:
    identifying whether a current retune proposal conflicts with any previously approved retune proposals.

13. The method as in claim 12 wherein the step of identifying is satisfied if:
    a frequency in the current retune proposal to be dropped or added with respect to the cell of the current retune proposal matches a frequency to be dropped or added with respect to the cell of the previously approved retune proposal; and
    a distance between the cell of the current retune proposal and the cell of the previously approved retune proposal is less than a certain threshold distance.

14. The method as in claim 13 wherein the frequency in the current retune proposal is assigned to a transceiver in the cell of the current retune proposal.

15. The method as in claim 12 wherein the step of identifying is satisfied if:
    a frequency in the current retune proposal to be dropped or added with respect to the cell of the current retune proposal is adjacent a frequency to be dropped or added with respect to the cell of the previously approved retune proposal; and
    a distance between the cell of the current retune proposal and the cell of the previously approved retune proposal is less than a certain threshold distance.

16. The method as in claim 15 wherein the frequency in the current retune proposal is assigned to a transceiver in the cell of the current retune proposal.

17. The method as in claim 1 wherein the step of evaluating the radio environment statistics measurements to define at least one retune proposal for at least one cell comprises the steps of:

utilizing the radio environment statistics measurements to identify for the retune proposal certain selected frequencies of the at least one cell to be deleted; and utilizing the radio environment statistics measurements to identify for the retune proposal certain candidate frequencies to be assigned to the at least one cell in place of the selected frequencies to be deleted.

18. The method as in claim 17 wherein:

the radio environment statistics measurements indicate that the certain selected frequencies are unacceptably interfered; and the radio environment statistics measurements indicate that the certain candidate frequencies are either un-interfered or less interfered than the certain selected frequencies.

19. The method as in claim 1 wherein the step of evaluating the retune proposal in view of the downlink interference measurements and repeated radio environment statistics measurements to select a single retune proposal per cell for implementation comprises the steps of:

utilizing the radio environment statistics measurements to identify certain ones of the at least one retune proposal for the at least one cell as being undesirable;

utilizing the repeated downlink interference measurements to identify certain other ones of the at least one retune proposal for the at least one cell as being undesirable; and eliminating the identified certain ones and certain other ones of the at least one retune proposal to select the single retune proposal per cell.

20. The method as in claim 19 wherein the plural steps of utilizing each identify the undesirable retune proposals as those certain ones of the at least one retune proposal and those certain other ones of the at least one retune proposal whose radio environment statistics measurements and downlink interference measurements, respectively, indicate unacceptable levels of interference.

21. The method as in claim 1 wherein the step of evaluating the implemented retune proposal in view of the repeated downlink interference measurements and again repeated radio environment statistics measurements to confirm efficacy of implemented retune proposal to reduce network interference comprises the steps of:

utilizing the again repeated radio environment statistics measurements to identify whether the implemented retune proposal effectuated a reduction in interference at the cell; and utilizing the repeated downlink interference measurements to identify whether the implemented retune proposal effectuated a reduction in interference at the cell.

22. A frequency planning tool for a cellular communications network, comprising:

means for collecting radio environment statistics measurements and downlink interference measurements within each cell of a cellular communications network; and a frequency reallocation editor comprising a graphical user interface for allowing a user to:

analyze data resulting from the processing of collected radio environment statistics measurements and downlink interference measurements;

define using the data at least one retune proposal for consideration per cell for implementation in making a revision to a frequency plan assignment for the cellular communications network;

select a single retune proposal per cell for implementation in making a revision to a frequency plan assignment for the cellular communications network;

schedule implementation of the selected single retune proposal as a revision of the frequency plan;

evaluate using the data the efficacy of the revised frequency plan; and implement a roll-back of the revision to the frequency plan if the efficacy is unsatisfactory.

23. The frequency planning tool as in claim 22 wherein the frequency reallocation editor comprises:

a frequency set display functionality for allowing the user to graphically manage the frequency plan.

24. The frequency planning tool as in claim 23 wherein the frequency set display functionality supports at least one of:

user graphical creation of a frequency set;

user graphical selection of a hyperband;

user graphical sector specification;

user graphical specification of a number of frequency groups per sector;

user graphical definition of a frequency content for each sub-frequency group; and user graphical specification of a certain frequency within a sub-frequency group as a control channel frequency.

25. The frequency planning tool as in claim 22 wherein the frequency reallocation editor comprises:

a graphical cell display functionality for allowing a user to graphically view frequency reallocation activity in the cellular communications network with respect to frequency plan revisions.

26. The frequency planning tool as in claim 25 wherein the graphical cell display functionality supports at least one of:

graphical presentation of cells of interest to the user overlaid on a service area geographic map; and visual discrimination of data comprising status, value and item related information concerning network operation.

27. The frequency planning tool as in claim 25 wherein the graphical cell display functionality supports at least one of the following display options:

a global display option wherein data of interest to the user is presented for all cells in one or more selected mobile switching centers; and an impact display option wherein data of interest to the user is presented for all cells implicated by a certain selected frequency reallocation activity in the cellular communications network with respect to a frequency plan revision.

28. The frequency planning tool as in claim 22 wherein the frequency reallocation editor comprises:

a report generation functionality for graphically presenting data of interest to the user frequency reallocation activity in the cellular communications network with respect to a frequency plan revision.

29. The frequency planning tool as in claim 28 wherein the report generation functionality supports at least one of the following report options:

a bar chart reporting data of interest;

a line chart reporting data of interest; and a trend chart reporting trends in the data of interest.

30. A method for making a revision to a frequency plan assignment for a cellular communications network, comprising the steps of:

making radio environment statistics measurements concerning the network;

evaluating the radio environment statistics measurements to define at least one retune proposal for at least one cell;

evaluating each retune proposal, wherein the step of evaluating each retune proposal further comprises the steps of:

determining whether each retune proposal is compatible with a current cell configuration for that at least one cell; and rejecting any retune proposal which is incompatible; and revising the frequency plan assignment in accordance with a selected one of the compatible retune proposals.

31. The method as in claim 30 wherein the current cell configuration is defined in part by a need for an analog control channel, and a need for a digital control channel, and wherein the step of determining compatibility comprises the steps of:

confirming that the retune proposal includes a frequency for supporting that analog control channel; and confirming that the retune proposal includes a frequency for supporting that digital control channel.

32. The method as in claim 30 wherein the current cell configuration is defined in part by a need to support certain modes of operation, and wherein the step of determining compatibility comprises the step of:

confirming that the retune proposal includes enough frequencies for supporting traffic channel requirements of the certain modes of operation.

33. The method as in claim 30 wherein the current cell configuration is defined in part by a need for a control channel and by a need to support certain modes of operation, and wherein the step of determining compatibility comprises the steps of:

confirming that the retune proposal includes a frequency for supporting the needed control channel; and confirming that the retune proposal includes enough frequencies for supporting traffic channel requirements of the certain modes of operation.

34. The method as in claim 33 wherein the control channel comprises at least one of an analog control channel and a digital control channel.

35. The method as in claim 33 wherein the certain modes of operation comprises at least one of an analog voice traffic, a digital voice traffic, and data traffic.

36. The method as in claim 30 wherein the step of evaluating the radio environment statistics measurements to define at least one retune proposal for at least one cell comprises the steps of:

utilizing the radio environment statistics measurements to identify for the retune proposal certain selected frequencies of the at least one cell to be deleted; and utilizing the radio environment statistics measurements to identify for the retune proposal certain candidate frequencies to be assigned to the at least one cell in place of the selected frequencies to be deleted.

37. The method as in claim 36 wherein:

the radio environment statistics measurements indicate that the certain selected frequencies are unacceptably interfered; and the radio environment statistics measurements indicate that the certain candidate frequencies are either un-interfered or less interfered than the certain selected frequencies.

38. A method for making a revision to a frequency plan assignment for a cellular communications network, comprising the steps of:

making radio environment statistics measurements concerning the network;

evaluating the radio environment statistics measurements to define at least one retune proposal for at least one cell;

evaluating each retune proposal, wherein the step of 10 evaluating each retune proposal further comprises the steps of:

ensuring that a sufficient number of frequencies are included within each retune proposal to be assigned to each transceiver within the at least one cell; and revising the frequency plan assignment in accordance with a selected one of the retune proposals having a sufficient number of frequencies.

39. The method as in claim 38 wherein the step of ensuring sufficiency comprises the step of:

assigning frequencies from each retune proposal to transceivers in the at least one cell.

40. The method as in claim 39 wherein the step of assigning comprises the steps of:

first assigning frequencies for control channels in the retune proposal to control channel ones of the transceivers; and next assigning frequencies for traffic channels in the retune proposal to traffic channel ones of the transceivers.

41. The method as in claim 38 wherein the step of evaluating the radio environment statistics measurements to define at least one retune proposal for at least one cell comprises the steps of:

utilizing the radio environment statistics measurements to identify for the retune proposal certain selected frequencies of the at least one cell to be deleted; and utilizing the radio environment statistics measurements to identify for the retune proposal certain candidate frequencies to be assigned to the at least one cell in place of the selected frequencies to be deleted.

42. The method as in claim 41 wherein:

the radio environment statistics measurements indicate that the certain selected frequencies are unacceptably interfered; and the radio environment statistics measurements indicate that the certain candidate frequencies are either un-interfered or less interfered than the certain selected frequencies.

43. A method for making a revision to a frequency plan assignment for a cellular communications network, comprising the steps of:

making radio environment statistics measurements concerning the network;

evaluating the radio environment statistics measurements to define at least one retune proposal for at least one cell; and evaluating each retune proposal, wherein the step of evaluating each retune proposal further comprises the steps of:

determining whether there would be any adverse effect on the network if the retune proposal should be implemented; and rejecting any retune proposal which adversely affects; and revising the frequency plan assignment in accordance with a selected one of the retune proposals that was not rejected.

44. The method as in claim 43 wherein the step of determining whether there would be any adverse effect on the network if the retune proposal should be implemented comprises the step of:

identifying whether a current retune proposal conflicts with any previously approved retune proposals.

45. The method as in claim 44 wherein the step of identifying is satisfied if:

a frequency in the current retune proposal to be dropped or added with respect to the cell of the current retune proposal matches a frequency to be dropped or added with respect to the cell of the previously approved retune proposal; and a distance between the cell of the current retune proposal and the cell of the previously approved retune proposal is less than a certain threshold distance.

46. The method as in claim 44 wherein the step of identifying is satisfied if:

a frequency in the current retune proposal to be dropped or added with respect to the cell of the current retune proposal is adjacent a frequency to be dropped or added with respect to the cell of the previously approved retune proposal; and a distance between the cell of the current retune proposal and the cell of the previously approved retune proposal is less than a certain threshold distance.

47. The method as in claim 43 wherein the step of evaluating the radio environment statistics measurements to define at least one retune proposal for at least one cell comprises the steps of:

utilizing the radio environment statistics measurements to identify for the retune proposal certain selected frequencies of the at least one cell to be deleted; and utilizing the radio environment statistics measurements to identify for the retune proposal certain candidate frequencies to be assigned to the at least one cell in place of the selected frequencies to be deleted.

48. The method as in claim 47 wherein:

the radio environment statistics measurements indicate that the certain selected frequencies are unacceptably interfered; and the radio environment statistics measurements indicate that the certain candidate frequencies are either un-interfered or less interfered than the certain selected frequencies.

49. A method for making a revision to a frequency plan assignment for a cellular communications network, comprising the steps of:

defining at least one retune proposal for at least one cell;
making downlink interference measurements;
making radio environment statistics measurements;
evaluating the retune proposal in view of the downlink interference measurements and radio environment statistics measurements to select a single retune proposal per cell for implementation; and
implementing the selected single retune proposal per cell to effectuate a retune of the network.

50. The method as in claim 49 wherein the step of evaluating the retune proposal in view of the downlink interference measurements and radio environment statistics measurements to select a single retune proposal per cell for implementation comprises the steps of:

utilizing the radio environment statistics measurements to identify certain ones of the at least one retune proposal for the at least one cell as being undesirable;

utilizing the repeated downlink interference measurements to identify certain other ones of the at least one retune proposal for the at least one cell as being undesirable; and eliminating the identified certain ones and certain other ones of the at least one retune proposal to select the single retune proposal per cell.

51. The method as in claim 50 wherein the plural steps of utilizing each identify the undesirable retune proposals as those certain ones of the at least one retune proposal and those certain other ones of the at least one retune proposal whose radio environment statistics measurements and downlink interference measurements, respectively, indicate unacceptable levels of interference.

52. A method for making a revision to a frequency plan assignment for a cellular communications network, comprising the steps of:

defining at least one retune proposal for at least one cell;
selecting a single retune proposal per cell for implementation;
implementing the selected single retune proposal per cell to effectuate a retune of the network
making downlink interference measurements;
making radio environment statistics measurements; and
evaluating the implemented retune proposal in view of the downlink interference measurements and radio environment statistics measurements to confirm efficacy of implemented proposal to reduce network interference.

53. The method as in claim 52 wherein the step of evaluating the implemented retune proposal in view of the downlink interference measurements and radio environment statistics measurements to confirm efficacy of implemented retune proposal to reduce network interference comprises the steps of:

utilizing the again repeated radio environment statistics measurements to identify whether the implemented retune proposal effectuated a reduction in interference at the cell; and utilizing the repeated downlink interference measurements to identify whether the implemented retune proposal effectuated a reduction in interference at the cell.

54. The method as in claim 52 further comprising the step of:

rolling back of the implemented retune proposal in the event network interference is not satisfactorily reduced.

55. A method of qualifying a candidate retune proposal for application to a certain cell, comprising the steps of:

rejecting the candidate retune proposal in the event that a number of analog control channel frequencies in the candidate retune proposal is insufficient for a number of analog control channel transceivers in a configuration for that certain cell;

rejecting the candidate retune proposal in the event that a number of digital control channel frequencies in the candidate retune proposal is insufficient for a number of digital control channel transceivers in a configuration for that certain cell;

rejecting the candidate retune proposal in the event that a number of traffic channel frequencies in the candidate retune proposal is insufficient for a number of traffic channel transceivers in a configuration for that certain cell.

56. The method as in claim 55 wherein the step of rejecting the candidate retune proposal in the event that a number of traffic channel frequencies in the candidate retune proposal is insufficient for a number of traffic channel transceivers in a configuration for that certain cell comprises the steps of:

determining whether a sufficient number of analog traffic channel frequencies in the candidate retune proposal is sufficient for a number of analog traffic channel transceivers in the configuration for that certain cell;

determining whether a sufficient number of digital traffic channel frequencies in the candidate retune proposal is sufficient for a number of digital traffic channel transceivers in the configuration for that certain cell; and determining whether a sufficient number of dual mode analog/digital traffic channel frequencies in the candidate retune proposal is sufficient to make up for any determined deficiencies in the numbers of analog traffic channel frequencies and digital traffic channel frequencies for the analog and digital traffic channel transceivers, respectively.

57. The method of claim 55 further comprising the step of assigning a plurality of frequencies for the candidate retune proposal to transceivers in the certain cell, wherein the step of assigning comprises the steps of:

assigning an analog control channel frequency in the retune proposal to any analog control channel transceiver present in the cell configuration;

assigning a digital control channel frequency in the retune proposal to any digital control channel transceiver present in the cell configuration;

assigning digital traffic channel frequencies to any digital traffic channel transceivers in the cell configuration;

assigning dual mode traffic channel frequencies to any remaining unassigned digital traffic transceivers;

assigning analog traffic channel frequencies to any analog traffic channel transceivers in the cell configuration;

assigning dual mode traffic channel frequencies to any remaining unassigned analog traffic transceivers.

58. A method of validating a candidate retune proposal for application to a certain cell, comprising the steps of:

comparing a candidate retune proposal with a previously approved retune proposal to determine if a frequency in the candidate retune proposal is the same as or adjacent to a frequency in the previously approved retune proposal;

calculating the distance between the certain cell of the candidate retune proposal and a cell of the previously approved retune proposal having a same or adjacent frequency;

warning a user if the calculated distance is less than a predetermined threshold; and approving the candidate retune proposal if the calculated distance is greater than a predetermined threshold.

* * * * *

UNITED STATES PATENT AND TRADEMARK OFFICE
CERTIFICATE OF CORRECTION

PATENT NO. : 6,049,717
DATED : April 11, 2000
INVENTOR(S) : Dufour, et al.

It is certified that error appears in the above-identified patent and that said Letters Patent is hereby corrected as shown below:

Column 2,
Line 28, replace "wish" with --with--

Column 5,
Line 27, replace "10  (7)" with --10 (7) --
Line 29, replace "10  (2)" with --10 (2) --
Line 36, replace "A1  (n)" with --A1 (n) --
Line 37-38, replace "B2  (n)" with --B2 (n) --

Column 8,
Line 27, replace "cells) The" with --cells).  The--

Column 10,
Line 9, replace "age of the values for" with --age of the--
Line 58, replace "$I_{up\_freq\_eval\ (digital)}$" with --$I_{up\_sel\_freq\_eval\ (digital)}$--

Column 14,
Line 10, replace "(ACC) Accordingly," with --(ACC). Accordingly,--

Column 15,
Line 15, replace "($f_{dCC}$) If" with -- ($f_{dCC}$). If--
Line 18, replace "step) 216" with --step 216--

Column 16,
Line 43, replace "(operating" with --operating--

Column 19,
Line 22, replace "E (2)" with --E(2)--

Column 20,
Line 44, replace "issues," with --issue,--

Column 21,
Line 20, replace "$I_{up\_old\_pre}$" with --$I_{up\_old\_w\_pre}$--

UNITED STATES PATENT AND TRADEMARK OFFICE
CERTIFICATE OF CORRECTION

PATENT NO. : 6,049,717
DATED : April 11, 2000
INVENTOR(S) : Dufour, et al.

It is certified that error appears in the above-identified patent and that said Letters Patent is hereby corrected as shown below:

Column 22,
Line 33-34, replace "sub-frequency frequency" with --sub-frequency--

Column 24,
Line 48, replace "2) The" with --2). The--

Column 25,
Line 8, replace "groups) The" with --groups). The--
Line 26, replace "charges" with --changes--

Column 32,
Line 16, replace "step of 10" with --step of--

Signed and Sealed this

Third Day of July, 2001

*Nicholas P. Godici*

Attest:

Attesting Officer

NICHOLAS P. GODICI
*Acting Director of the United States Patent and Trademark Office*